(12) United States Patent
Tajima

(10) Patent No.: US 10,896,008 B2
(45) Date of Patent: Jan. 19, 2021

(54) DISPLAY APPARATUS, PRINTER, PRINT CONTROL APPARATUS, AND RECORDING MEDIUM

(71) Applicant: FUJI XEROX CO., LTD., Tokyo (JP)

(72) Inventor: Shingo Tajima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 188 days.

(21) Appl. No.: 16/033,343

(22) Filed: Jul. 12, 2018

(65) Prior Publication Data
US 2019/0034130 A1 Jan. 31, 2019

(30) Foreign Application Priority Data
Jul. 26, 2017 (JP) .................. 2017-144743

(51) Int. Cl.
*H04N 1/00* (2006.01)
*G06F 3/12* (2006.01)
*G06F 3/0484* (2013.01)

(52) U.S. Cl.
CPC .......... *G06F 3/1207* (2013.01); *G06F 3/1203* (2013.01); *G06F 3/1259* (2013.01); *G06F 3/1273* (2013.01); *G06F 3/04845* (2013.01)

(58) Field of Classification Search
CPC .... G06F 3/1259; G06F 3/1203; G06F 3/1207; G06F 3/04845; G06F 3/1273

USPC ....................................................... 358/1.15
See application file for complete search history.

(56) References Cited

U.S. PATENT DOCUMENTS

2007/0024905 A1* 2/2007 Muroi .................. G06F 3/1207
                                                                358/1.16
2014/0180717 A1* 6/2014 Mihara .................. G16H 30/20
                                                                705/3

FOREIGN PATENT DOCUMENTS

JP               5511077 B2      6/2014

* cited by examiner

*Primary Examiner* — Saeid Ebrahimi Dehkordy
(74) *Attorney, Agent, or Firm* — Oliff PLC

(57) ABSTRACT

A display apparatus includes a specifying section, a decision section, and a display controller. The specifying section specifies print jobs satisfying a search condition designated to select a print job. The decision section decides an enlargement/reduction ratio on a time axis so that when events related to print jobs satisfying the search condition are displayed in a display area arranged in a time series, a start time of a first event and an end time of a last event are contained in the display area. The display controller controls the display of a line of events related to print jobs satisfying the search condition, enlarged or reduced by the decided enlargement/reduction ratio, in the display area.

7 Claims, 31 Drawing Sheets

FIG. 5

| PRINT JOB ID | PRINT JOB NAME | OWNER | PAGES | COPIES | PAPER SIZE | ... |
|---|---|---|---|---|---|---|
| 1 | PAMPHLET AAA-1 | USER A | 16 | 50 | A4 | |

| PRINT JOB ID | EVENT RECEIVE | | | |
|---|---|---|---|---|
| | EVENT ID | START TIME | END TIME | RESULT |
| 1 | E-001 | xxxx/xx/xx/xx/xx | xxxx/xx/xx/xx/xx | NORMAL END |
| 2 | E-021 | xxxx/xx/xx/xx/xx | xxxx/xx/xx/xx/xx | NORMAL END |

| EVENT GENERATE INTERMEDIATE FORM | | | |
|---|---|---|---|
| EVENT ID | START TIME | END TIME | RESULT |
| E-002 | xxxx/xx/xx/xx/xx | xxxx/xx/xx/xx/xx | NORMAL END |
| E-022 | xxxx/xx/xx/xx/xx | xxxx/xx/xx/xx/xx | NORMAL END |

| EVENT GENERATE IMAGE | | | |
|---|---|---|---|
| EVENT ID | START TIME | END TIME | RESULT |
| E-003 | xxxx/xx/xx/xx/xx | xxxx/xx/xx/xx/xx | NORMAL END |
| E-023 | xxxx/xx/xx/xx/xx | xxxx/xx/xx/xx/xx | NORMAL END |

| EVENT PRINT | | | |
|---|---|---|---|
| EVENT ID | START TIME | END TIME | RESULT |
| E-004 | xxxx/xx/xx/xx/xx | xxxx/xx/xx/xx/xx | ERROR (PAPER JAM) |
| E-024 | — | — | TO BE PROCESSED (WAITING TO PRINT) |

FIG. 7

| PRINT JOB TYPE | DISPLAY POSITION | DISPLAY RANGE |
|---|---|---|
| JOB TO BE PROCESSED (FUTURE PREDICTION DISPLAY JOB) | ALIGN EVENT END TIME WITH DISPLAY RANGE END TIME | MATCH WITH RANGE FROM START TO END OF SELECTED JOB |
| ERROR JOB | ALIGN EVENT WITH CENTER OF DISPLAY RANGE | MATCH WITH RANGE FROM EVENT START TIME OF EARLIER JOB TO EVENT END TIME OF LATER JOB |
| NORMAL END JOB | ALIGN EVENT START TIME WITH DISPLAY RANGE START TIME | MATCH WITH RANGE FROM START TO END OF EVENTS OF JOB |

FIG. 20

| PRINT JOB SELECTION METHOD | DISPLAY POSITION | DISPLAY RANGE |
|---|---|---|
| JUMP SELECTION TO PRINT JOB RETURNED BY PRINT JOB SEARCH | ALIGN EVENT START TIME WITH DISPLAY RANGE START TIME | MATCH WITH RANGE FROM START TO END OF PRINT JOB |
| SELECT ARBITRARY PRINT JOB FROM LIST | ALIGN EVENT START TIME WITH DISPLAY RANGE START TIME | DO NOT AUTOMATICALLY CHANGE DISPLAY RANGE |

FIG. 24

| EVENT STATUS | DISPLAY COLOR | WEIGHT |
|---|---|---|
| ERROR | RED | LARGE |
| WARNING | YELLOW | MEDIUM |
| NORMAL | GREEN | SMALL |

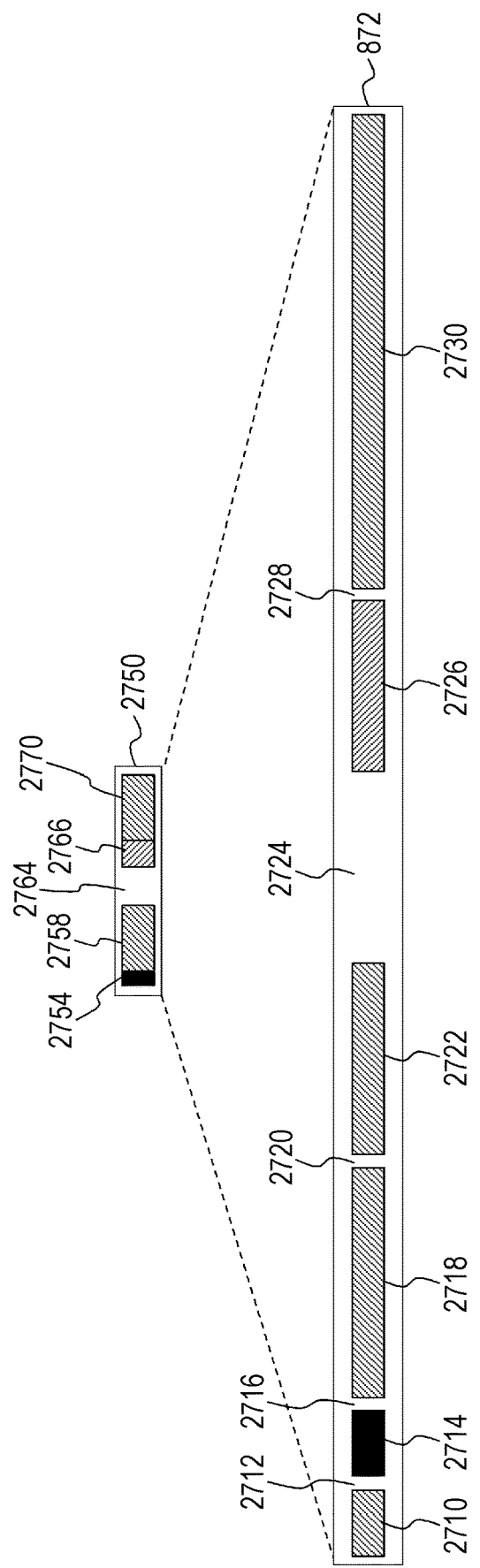

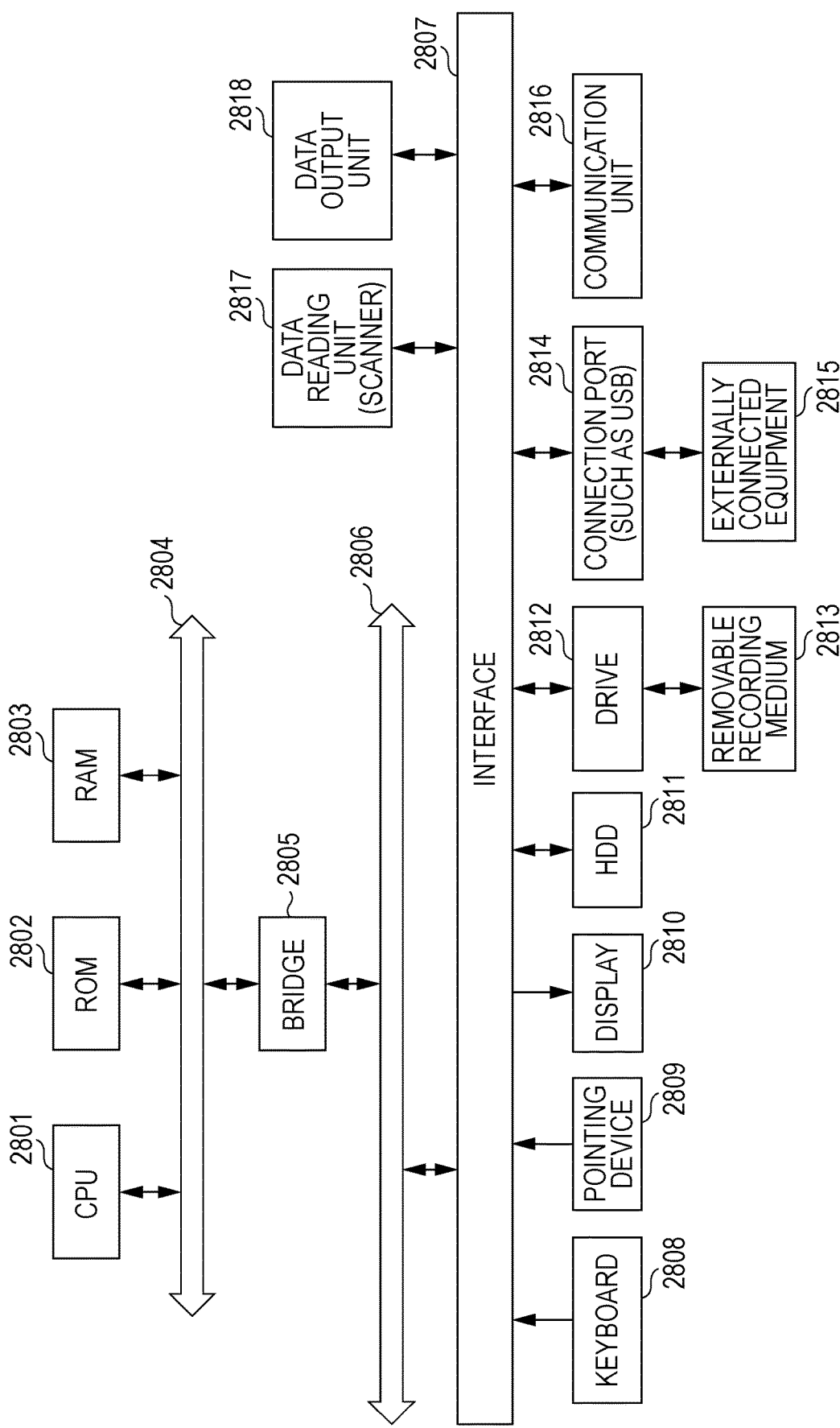

DISPLAY APPARATUS, PRINTER, PRINT CONTROL APPARATUS, AND RECORDING MEDIUM

CROSS-REFERENCE TO RELATED APPLICATIONS

This application is based on and claims priority under 35 USC 119 from Japanese Patent Application No. 2017-144743 filed Jul. 26, 2017.

BACKGROUND

Technical Field

The present invention relates to a display apparatus, a printer, a print control apparatus, and a recording medium.

SUMMARY

According to an aspect of the invention, there is provided a display apparatus including: a specifying section that specifies print jobs satisfying a search condition designated to select a print job; a decision section that decides an enlargement/reduction ratio on a time axis so that when events related to print jobs satisfying the search condition are displayed in a display area arranged in a time series, a start time of a first event and an end time of a last event are contained in the display area; and a display controller that controls the display of a line of events related to print jobs satisfying the search condition, enlarged or reduced by the decided enlargement/reduction ratio, in the display area.

BRIEF DESCRIPTION OF THE DRAWINGS

An exemplary embodiment of the present invention will be described in detail based on the following figures, wherein:

FIG. 5 is an explanatory diagram illustrating an exemplary data structure of a print job information table;

FIG. 6 is an explanatory diagram illustrating an exemplary data structure of a print job (event) log table;

FIG. 7 is an explanatory diagram illustrating an exemplary data structure of a print job type/display position/display range table;

FIG. 20 is an explanatory diagram illustrating an exemplary data structure of a selection method/display position/display range table;

FIG. 24 is an explanatory diagram illustrating an exemplary data structure of an event status/display color/weight table;

FIG. 27 is an explanatory diagram illustrating an exemplary display according to the exemplary embodiment; and FIG. 28 is a block diagram illustrating an exemplary hardware configuration of a computer that realizes the exemplary embodiment.

DETAILED DESCRIPTION

Hereinafter, an exemplary embodiment related to realizing the present invention will be described by way of example on the basis of the drawings.

Figure 1:
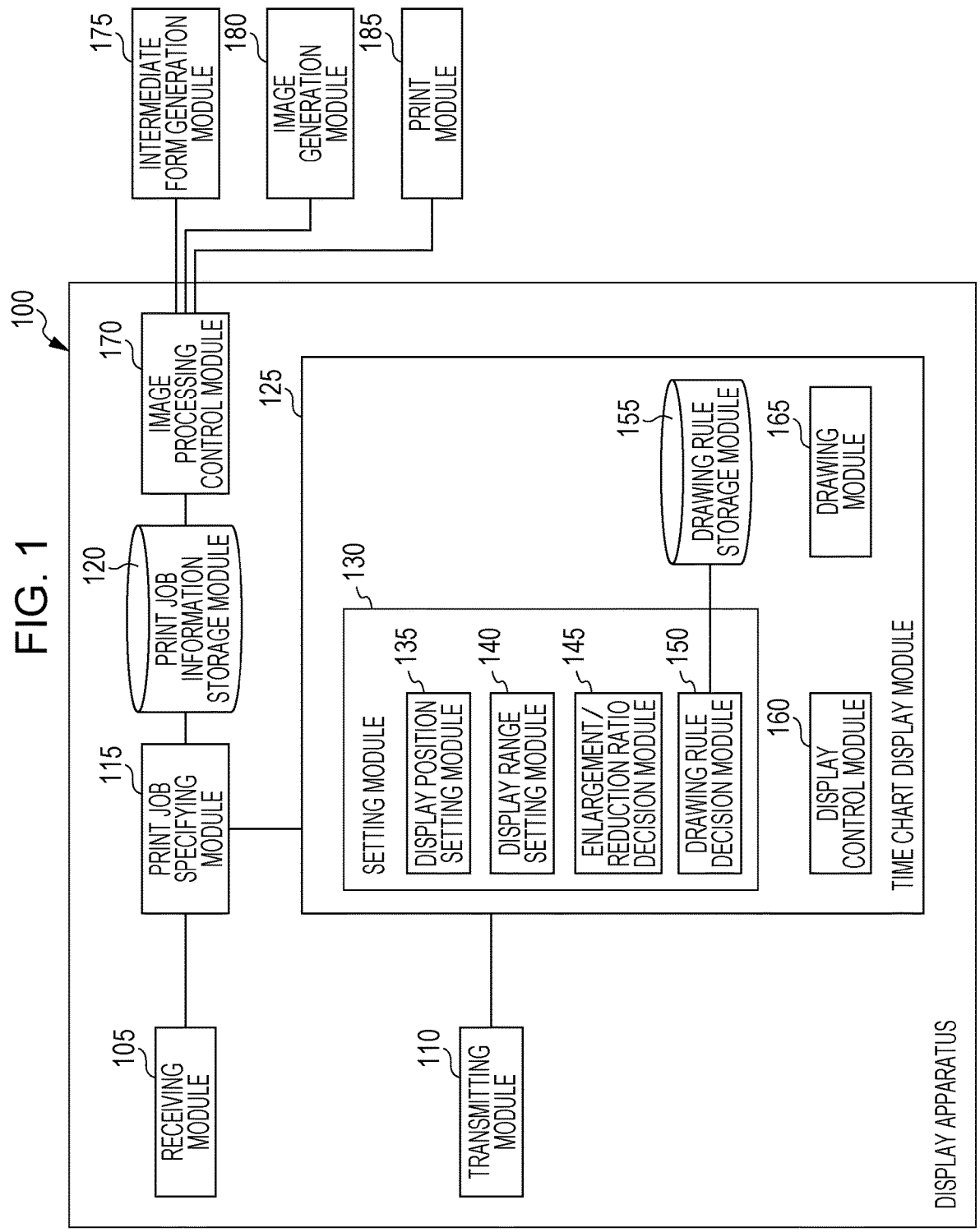
FIG. 1 is a schematic module configuration diagram for an exemplary configuration according to the exemplary embodiment.

FIG. 1 illustrates a schematic module configuration for an exemplary configuration according to the exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage apparatus is made to store information or that control is applied to cause a storage apparatus to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, in accordance with conditions or states at that time, or in accordance with conditions or states up to that time. In the case of multiple "predetermined values", the predetermined values may be respectively different values, or two or more values (this obviously also includes the case of all values) which are the same. Additionally, statements like "B is conducted in the case of A" are used to denote that a determination is made regarding whether or not A holds true, and B is conducted in the case where it is determined that A holds true. However, this excludes cases where the determination of whether or not A holds true may be omitted. Also, in the case of listing things, like "A, B, C" and so on, the listing is an illustrative example unless specifically noted otherwise, and includes the case of choosing only one among the listing (for example, A only).

Also, the terms "system" and "apparatus" not only encompass configurations in which multiple computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time multiple processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be reduced or omitted in some cases. Note that the storage apparatus herein may include a hard disk, random access memory (RAM), an auxiliary or external storage medium, a storage apparatus accessed via a communication link, and a register or the like inside a central processing unit (CPU).

A display apparatus 100 according to the present exemplary embodiment graphically displays, arranged on a time axis, operational state information (which may also include future prediction information) about a printer recorded as a history of print processes. As illustrated by the example of FIG. 1, the display 100 includes a receiving module 105, a transmitting module 110, a print job specifying module 115, a print job information storage module 120, a time chart display module 125, and an image processing control module 170.

The display apparatus 100 visually displays a time-series print history of print jobs (a process history), and includes what is known as a timeline function. Specifically, a start time (herein, time may be the year, month, day, hour, minute, second, fraction of a second, or some combination thereof) and an end time of a print history of print jobs may be set, and print job events occurring in between and the printer status is visualized and displayed in a time series.

Also, on the display apparatus 100, it is also possible to display a list of print jobs processed inside an arbitrary time range between the start time and the end time. Additionally, the time range may be changed arbitrarily in accordance with a specification operation by a user. For example, examples of time ranges proceeding from "narrow" to "wide" include 10 minutes, 30 minutes, 1 hour, 12 hours, 1 day, 1 week, all, and the like.

It is also possible to change a history display time range between the start time and the end time while keeping the specified time range. In other words, when the start time is changed, since the time range is kept fixed, the end time is also change according to the change in the start time. For example, the history display time range is changed by moving (sliding) a scroll bar (display time band) illustrated in FIG. 9 left or right, as described later.

Also, that which is displayed in a time series on the display apparatus 100 includes not only a history farther in the past than the current time, but also prediction information farther in the future than the current time. For example, as described later, the left side of a current time display line illustrated in FIG. 10 indicates the past history, while the right side of the current time display line 1030 indicates the future prediction.

The receiving module 105 is connected to the print job specifying module 115. The receiving module 105 receives operations by a user. The operations may be operations received from a user terminal 280 described later using the example of FIG. 2, or operations received by a user interface (such as a keyboard, mouse, or touch panel) provided in the display apparatus 100. The operations by a user include, for example, receiving a print job selected by the user. There may also be multiple selected print jobs.

The transmitting module 110 is connected to the time chart display module 125. The transmitting module 110 transmits a processing result by the time chart display module 125 to a user terminal 280. For example, the display of a browser on a user terminal 280 is controlled. In addition, a drawing module 165 may also execute display processing with respect to a display (such as a liquid crystal display) provided in the display apparatus 100.

The print job specifying module 115 is connected to the receiving module 105, the print job information storage module 120, and the time chart display module 125. The print job specifying module 115 specifies the print job selected by the user from among multiple print jobs displayed in a display area. The selection herein is selected by a user operation using a keyboard, mouse, touch panel, or the like.

Also, the print job specifying module 115 specifies print jobs satisfying a search condition designated for selecting a print job. At this point, the selection made after a search may be selected by a user operation using a keyboard, mouse, touch panel, or the like. Otherwise, in the case in which a print job is returned by the search, the search result is included in the selection. In other words, the search result itself (or the search instruction) may also correspond to a selection operation, even without an explicit selection operation by the user.

Also, the print job specifying module 115 acquires, from the print job information storage module 120, history information about print jobs for which the start time or the end time of the print process is included inside a specified period.

The print job information storage module 120 is connected to the print job specifying module 115 and the image processing control module 170. The print job information storage module 120 stores print jobs and a history of print jobs. For example, the print job information storage module 120 stores a print job information table 500 and a print job (event) log table 600 described later.

The time chart display module 125 includes a setting module 130, a drawing rule storage module 155, a display control module 160, and the drawing module 165, and is connected to the transmitting module 110 and the print job specifying module 115. The time chart display module 125 is a module for realizing the timeline function, and graphically displays (controls the display of) a print job history and predictions about the state (status) of print jobs which are going to be processed.

The setting module 130 includes a display position setting module 135, a display range setting module 140, an enlargement/reduction ratio decision module 145, and a drawing rule decision module 150. The setting module 130 decides the position, display range, enlargement/reduction ratio, and drawing rules of a targeted print job inside the display area.

The display position setting module 135 sets a start point and/or an end point on the time axis when displaying events related to a targeted print job arranged in a time series in the display area, in accordance with an attribute of the print job specified by the print job specifying module 115. Herein, the "targeted print job" refers to the print job specified by the print job specifying module 115. The "attribute of the print job" includes the status of the print job, specifically referring to the state (status) of the process at the current point in time, which may be Normal End, Queued Job (a print job whose process has not started), Error, or the like. "Events related to a print job" refer to processing content (also called processes) from the reception to the end of the print job, and specifically refer to Received, First-stage Image Generation Process, Second-stage Image Generation Process, Printing, and the like. Also, these states of the process (specifically, Normal End, Queued Job, Error, and the like) may also be included in correspondence with the process.

The "start point on the time axis" refers to the position indicating that a process has started when the process is expressed graphically on the time axis, and specifically refers the position of the left edge of the process on the time axis when the past is set on the left and the future on the right.

The "end point on the time axis" refers to the position indicating that a process has ended when the process is expressed graphically on the time axis, and specifically refers the position of the right edge of the process on the time axis when the past is set on the left and the future on the right.

For example, the display area is divided into a list area that displays a print job list, and a graphical area that graphically displays events (processes) executed by each print job arranged in a time series. Additionally, in the list area, an identifier (such as a job ID or a job name) that uniquely identifies each job may also be displayed. Obviously, the print jobs displayed in the list area and the print job events displayed in the graphical area correspond to each other.

Also, in the list area, it is desirable for the print jobs to be sorted in ascending or descending order by the start time or the end time. This is because events are also displayed for the print jobs which have been processed before or will be processed after the selected print job on the time axis, and particularly because an error occurring in a print job is sometimes caused by a preceding or succeeding print job.

In addition, in the case in which the attribute of the print job is Normal End, the display position setting module 135 may shift the time axis so that the start time of the print job specified by the print job specifying module 115 becomes the left edge of the display area.

In addition, in the case in which the attribute of the print job is Queued, the display position setting module 135 may shift the time axis so that the predicted end time of the print job specified by the print job specifying module 115 becomes the right edge of the display area.

In addition, in the case in which the attribute of the print job is Error, the display position setting module 135 may shift the time axis so that the start time of the print job specified by the print job specifying module 115 is in between the left edge and the right edge of the display area. Herein, "in between the left edge and the right edge of the display area" means shifting the time axis so that the time is displayed in approximately the center of the display area (for example, so that the time fits inside a predetermined interval from the center).

The display range setting module 140 sets the time on the left edge and the time on the right edge inside the display area, in accordance with an operation by the user. For example, the operation corresponds to an operation on the scroll bar (display time band) 910 illustrated in FIG. 9 described later. In other words, by changing the size (length) of the scroll bar (display time band) 910, the history display time range (the length of the period) inside the display area is specified. Additionally, by moving the scroll bar (display time band) 910 in a time series display area 820, the start point and the end point inside the display area are specified.

The enlargement/reduction ratio decision module 145 decides the reduction ratio or enlargement ratio on the time axis, in accordance with the attribute of the print job.

In the case in which the attribute of a print job A is Error, the enlargement/reduction ratio decision module 145 decides the reduction ratio or the enlargement ratio on the time axis so that the event start time of a print job processed before the print job A and the event end time of a print job processed after the print job A are contained inside the display area.

For example, in the case in which the display ratio of the targeted print job on the time axis of the display area is less than, or less than or equal to, a predetermined ratio, an enlargement process is executed.

Also, the enlargement/reduction ratio decision module 145 decides the enlargement/reduction ratio on the time axis so that when the events related to print jobs satisfying a search condition are displayed in the display area arranged in a time series, the start time of the first event and the end time of the last event are contained in the display area.

Additionally, the enlargement/reduction ratio decision module 145 may also decide the enlargement/reduction ratio in the case in which the print job specified by the print job specifying module 115 is not being displayed in the display area.

Additionally, the enlargement/reduction ratio decision module 145 may also not execute the process of deciding the enlargement/reduction ratio in the case in which the print job specified by the print job specifying module 115 is being displayed in the display area.

In this case, if the print job specified by the print job specifying module 115 is being displayed in the display area, the display position setting module 135 sets the start point and/or the end point on the time axis when displaying the events related to the print job arranged in a time series in the display area, in accordance with the attribute of the print job.

Also, the enlargement/reduction ratio decision module 145 uses the history information acquired by the print job specifying module 115 to arrange multiple events related to print jobs on a single time axis, and computes a magnification for displaying the events contained in the display area along the time axis.

The drawing rule decision module 150 is connected to the drawing rule storage module 155. The drawing rule decision module 150 uses the print job history information acquired by the print job specifying module 115 to acquire status information about multiple events related to processes, and in accordance with the status information, decides drawing rules when using rectangles to express event processing times specified by the start time and the end time of each event.

The drawing rule storage module 155 is connected to the drawing rule decision module 150 of the setting module 130. The drawing rule storage module 155 stores drawing rules for drawing inside the display area. For example, the drawing rule storage module 155 stores a print job type/display position/display range table 700, a selection method/display position/display range table 2000, an event status/display color/weight table 2400 described later, and the like.

The display control module 160 controls the display position of each event related to the targeted print job, and each event related to print jobs being displayed before or after the print job in the display area, in accordance with the start point and/or the end point set by the display position setting module 135.

Additionally, the display control module 160 may also control the display of events related to the print job without executing enlargement or reduction.

Also, the display control module 160 controls the display in the display area of a line of events related to print jobs satisfying a search condition, the events being enlarged or reduced according to the enlargement/reduction ratio decided by the enlargement/reduction ratio decision module 145.

Also, the display control module 160 draws, in the display area, rectangles expressing each event reduced in the time axis direction by the magnification computed by the enlargement/reduction ratio decision module 145, in accordance with a weighting associated with the type of status information indicating the processing result of each event. Note that "weighting" includes the concept of priority. The largest weighting being applied means that the priority is the highest. A small weighting means that the priority is low.

In addition, the display control module 160 may also control drawing in accordance with the drawing rules decided by the drawing rule decision module 150. Also, by the drawing rules, events assigned the largest weighting may also not be reduced to the size of a minimum drawing unit or less, even if reduced by the magnification computed by the enlargement/reduction ratio decision module 145. Herein, "not being reduced to the size of a minimum drawing unit or less" means, for example, drawing with a width of 1 pixel, even if the reduced result is less than 1 pixel.

In addition, in the case in which a gap between adjacent events would disappear due to the reduction by the magnification computed by the enlargement/reduction ratio decision module 145, the display control module 160 may control the drawing of adjacent events as a single event if the adjacent events have the same type of status information.

Additionally, in the case in which adjacent events without a gap have different types of status information, the display control module 160 may prioritize the event with a small weighting, and control reduction by the magnification computed by the enlargement/reduction ratio decision module 145.

The drawing module 165 executes a display process with respect to the display, in accordance with the control by the display control module 160.

The image processing control module 170 is connected to the print job information storage module 120, an intermediate form generation module 175, an image generation module 180, and a print module 185. The image processing control module 170 controls the execution of a print process by the intermediate form generation module 175, the image generation module 180, and the print module 185 in accordance with a print job.

The intermediate form generation module 175 is connected to the image processing control module 170 of the display apparatus 100. The intermediate form generation module 175 executes a first-stage image generation process. Specifically, intermediate form document data is generated from a document to be printed by a print job. Herein, intermediate form document data has a data structure for a stage prior to generating data for printing. Since it is difficult to generate data for printing directly from a document, intermediate form document data is generated temporarily. Generating intermediate form document data from a document is easier than generating data for printing directly from the document. Furthermore, generating data for printing from intermediate form document data is easier than generating data for printing directly from a document.

The image generation module 180 is connected to the image processing control module 170 of the display apparatus 100. The image generation module 180 executes a second-stage image generation process. Specifically, data for printing (an image) printable by the print module 185 is generated from the intermediate form document data generated by the intermediate form generation module 175.

The print module 185 is connected to the image processing control module 170 of the display apparatus 100. The print module 185 executes printing in accordance with a print job. Specifically, the print module 185 controls the printer 220 illustrated in the example of FIG. 2 to print the data for printing generated by the image generation module 180.

Figure 2:
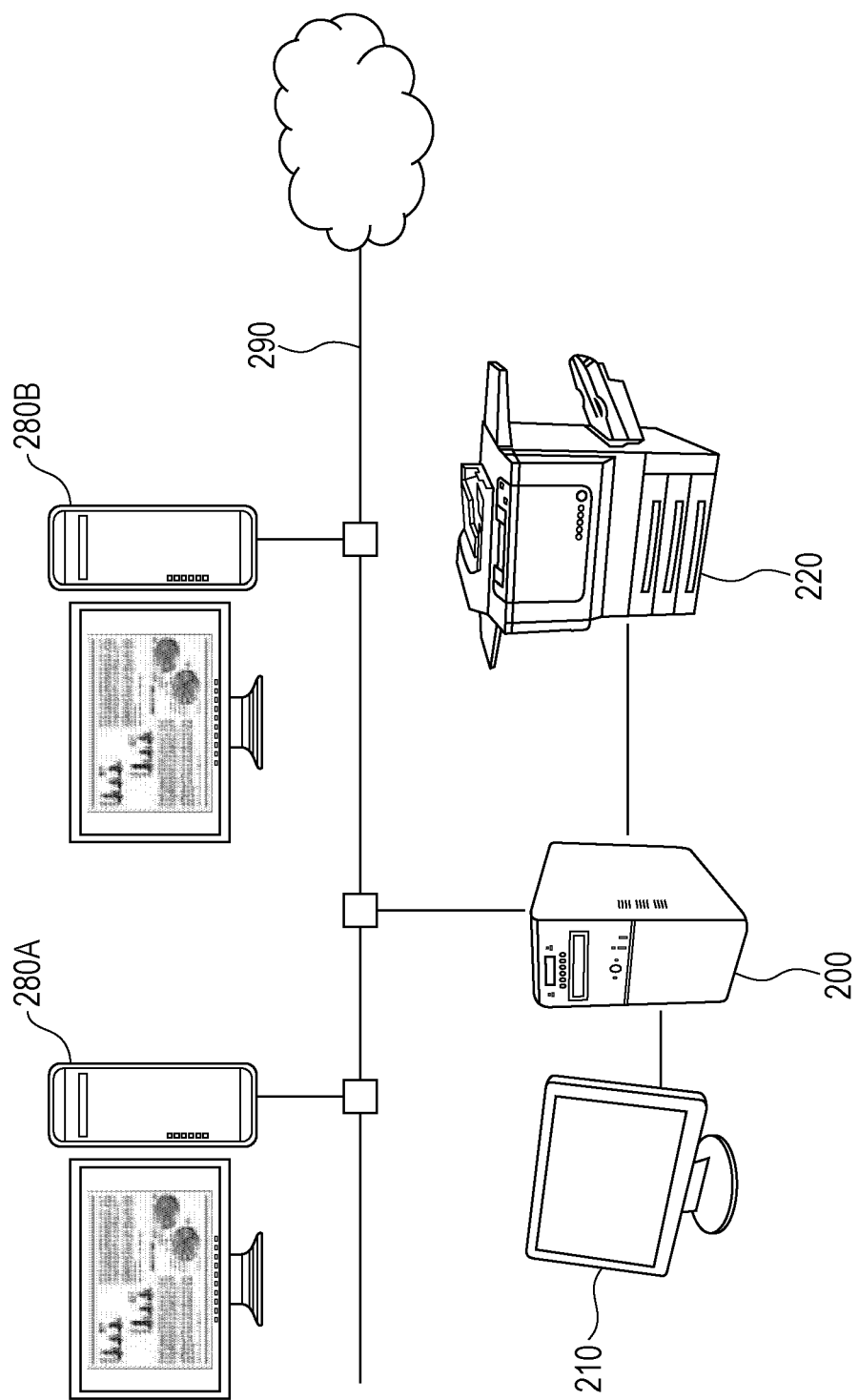
FIG. 2 is an explanatory diagram illustrating an exemplary system configuration utilizing the exemplary embodiment.

FIG. 2 is an explanatory diagram illustrating an exemplary system configuration utilizing the exemplary embodiment.

A print server 200 is connected to a display apparatus 210 and a printer 220, and is also connected to a user terminal 280A and a user terminal 280B through a communication link 290. For example, the display apparatus 100 is built into the print server 200. The communication link 290 may be wireless, wired, or a combination of the two, and may use a network such as the Internet or an intranet as a communication infrastructure, for example. Also, the functions provided by the print server 200 may also be realized as a cloud service.

The display apparatus 210 is connected to the print server 200, and is a liquid crystal display or the like. The drawing module 165 executes drawing with respect to the display apparatus 210. Also, the display control module 160 transmits drawing control data to a browser on the user terminals 280. The printer 220 is connected to the print server 200. The printer 220 includes the functions of the print module 185 (or the intermediate form generation module 175 and the image generation module 180). The user terminal 280A and the user terminal 280B are operated by users, and are connected to the print server 200 through the communication link 290.

Operations by users on the user terminal 280A and the user terminal 280B or operations by a user on the print server 200 are received by the receiving module 105.

Figure 3:
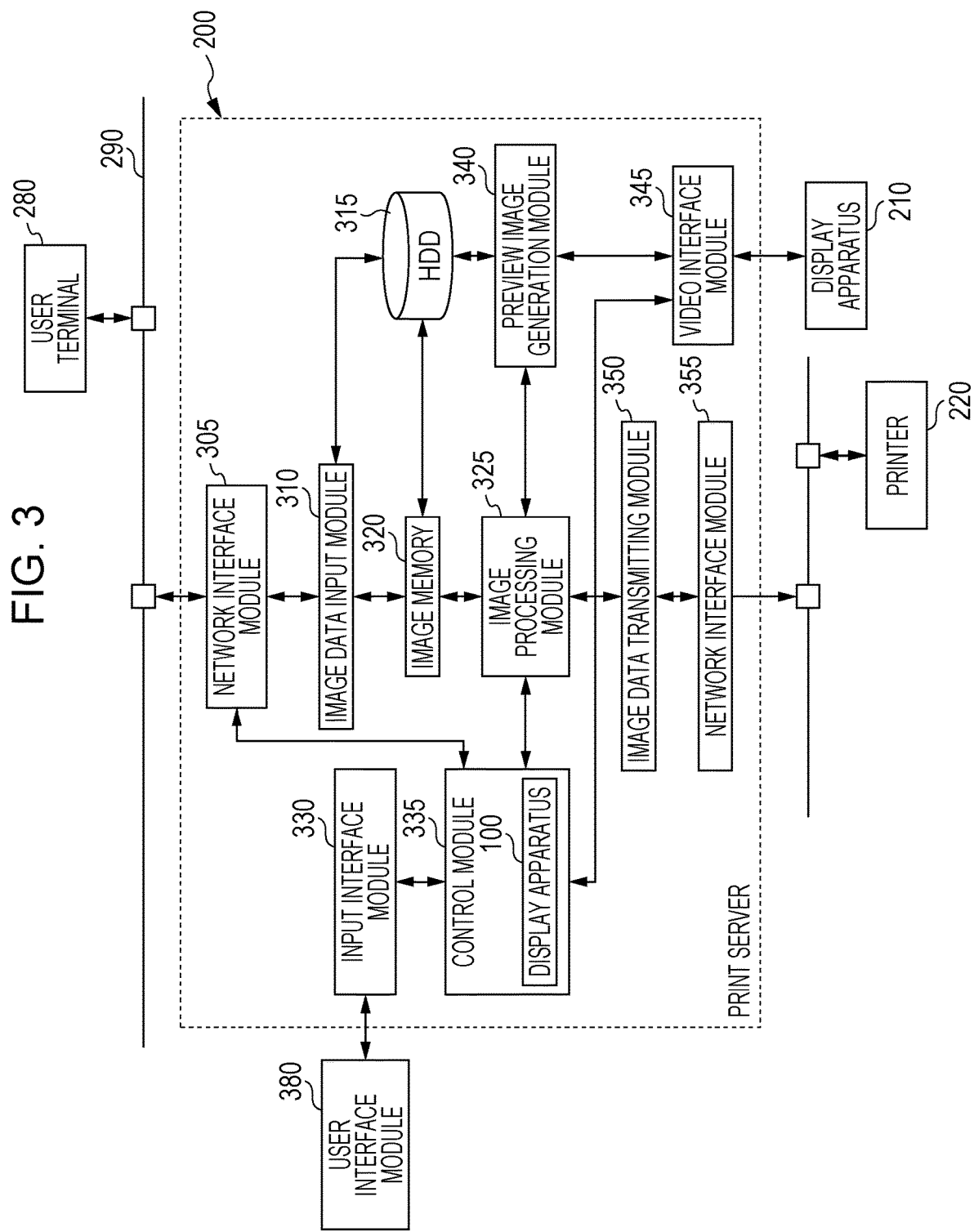
FIG. 3 is a specific hardware module configuration diagram for an exemplary configuration according to the exemplary embodiment.

FIG. 3 is a specific hardware module configuration diagram for an exemplary configuration according to the exemplary embodiment.

The print server 200 includes a network interface module 305, an image data input module 310, an HDD 315, image memory 320, an image processing module 325, an input interface module 330, a control module 335, a preview image generation module 340, a video interface module 345, an image data transmitting module 350, and a network interface module 355.

Figure 9:
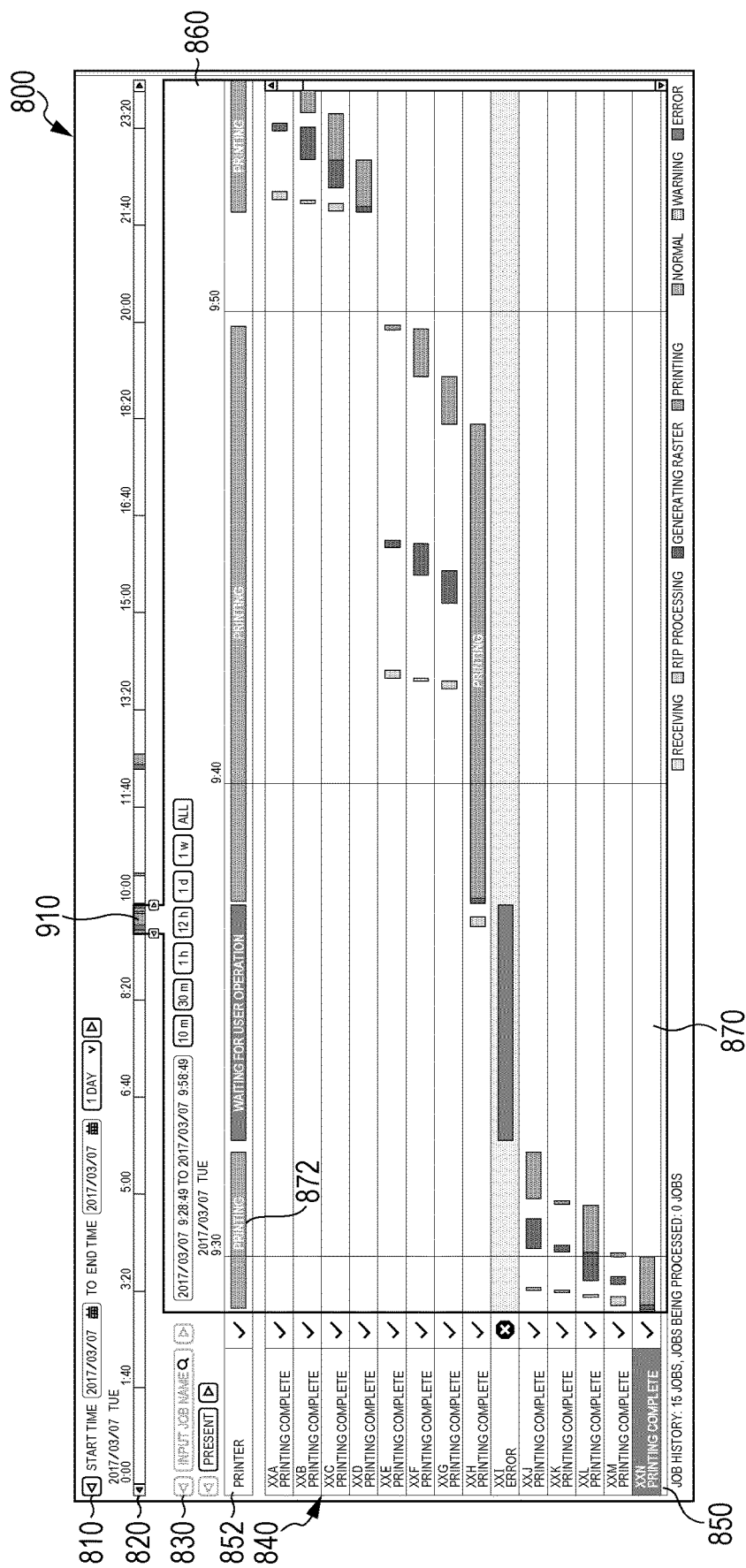
FIG. 9 is an explanatory diagram illustrating an exemplary display according to the exemplary embodiment.

The network interface module 305 is connected to the image data input module 310 and the control module 335, and is also connected to the user terminals 280 through the communication link 290. The network interface module 305 receives print jobs and user operations from the user terminals 280, and passes the print jobs to the image data input module 310, while passing the user operations to the receiving module 105 of the display apparatus 100. Also, the network interface module 305 transmits display control information (as illustrated by the example of FIG. 9, information for presenting a graphical display) from the transmitting module 110 of the display apparatus 100 to the user terminals 280.

The image data input module 310 is connected to the network interface module 305, the HDD 315, and the image memory 320. The image data input module 310 extracts print data to be printed from a print job, and stores the print data in the HDD 315.

The HDD 315 is connected to the image data input module 310, the image memory 320, and the preview image generation module 340. The HDD 315 stores print data.

The image memory 320 is connected to the image data input module 310, the HDD 315, and the image processing module 325. Print data inside the HDD 315 is loaded into the image memory 320. For example, intermediate form document data and data for printing are generated inside the image memory 320 by processing by the image processing module 325.

The image processing module 325 is connected to the image memory 320, the control module 335, the preview image generation module 340, and the image data transmitting module 350. The image processing module 325 largely includes the functions of the intermediate form generation module 175 and the image generation module 180, and generates intermediate form document data and data for printing from the print data inside the print job.

The input interface module 330 is connected to the control module 335 and a user interface module 380. The input interface module 330 receives a user operation performed with the user interface module 380, and passes the received operation to the receiving module 105 of the display apparatus 100.

The control module 335 includes the display apparatus 100, and is connected to the network interface module 305, the image processing module 325, the input interface module 330, and the video interface module 345. The control module 335 largely includes the functions of the display apparatus 100.

The preview image generation module 340 is connected to the HDD 315, the image processing module 325, and the video interface module 345. The preview image generation module 340 generates a preview image (a reduced image of the data for printing) for display by the display apparatus 210.

The video interface module 345 is connected to the control module 335, the preview image generation module 340, and the display apparatus 210. The video interface module 345 causes the display apparatus 210 to display operational state information from the display apparatus 100, and a preview image from the preview image generation module 340.

The image data transmitting module 350 is connected to the image processing module 325 and the network interface module 355. The image data transmitting module 350 controls the transmission of the data for printing generated by the image processing module 325 to the printer 220.

The network interface module 355 is connected to the image data transmitting module 350, and is also connected to the printer 220 through the communication link 290. The network interface module 355 transmits data for printing to the printer 220, under control by the image data transmitting module 350.

The user interface module 380 is connected to the input interface module 330 of the print server 200. The user interface module 380 is a keyboard, a mouse, a touch panel, or the like, and receives user operations.

The display apparatus 210 is connected to the video interface module 345 of the print server 200. The printer 220 is connected to the network interface module 355 of the print server 200 through the communication link 290. The user terminals 280 are connected to the network interface module 305 of the print server 200 through the communication link 290.

Figure 4:
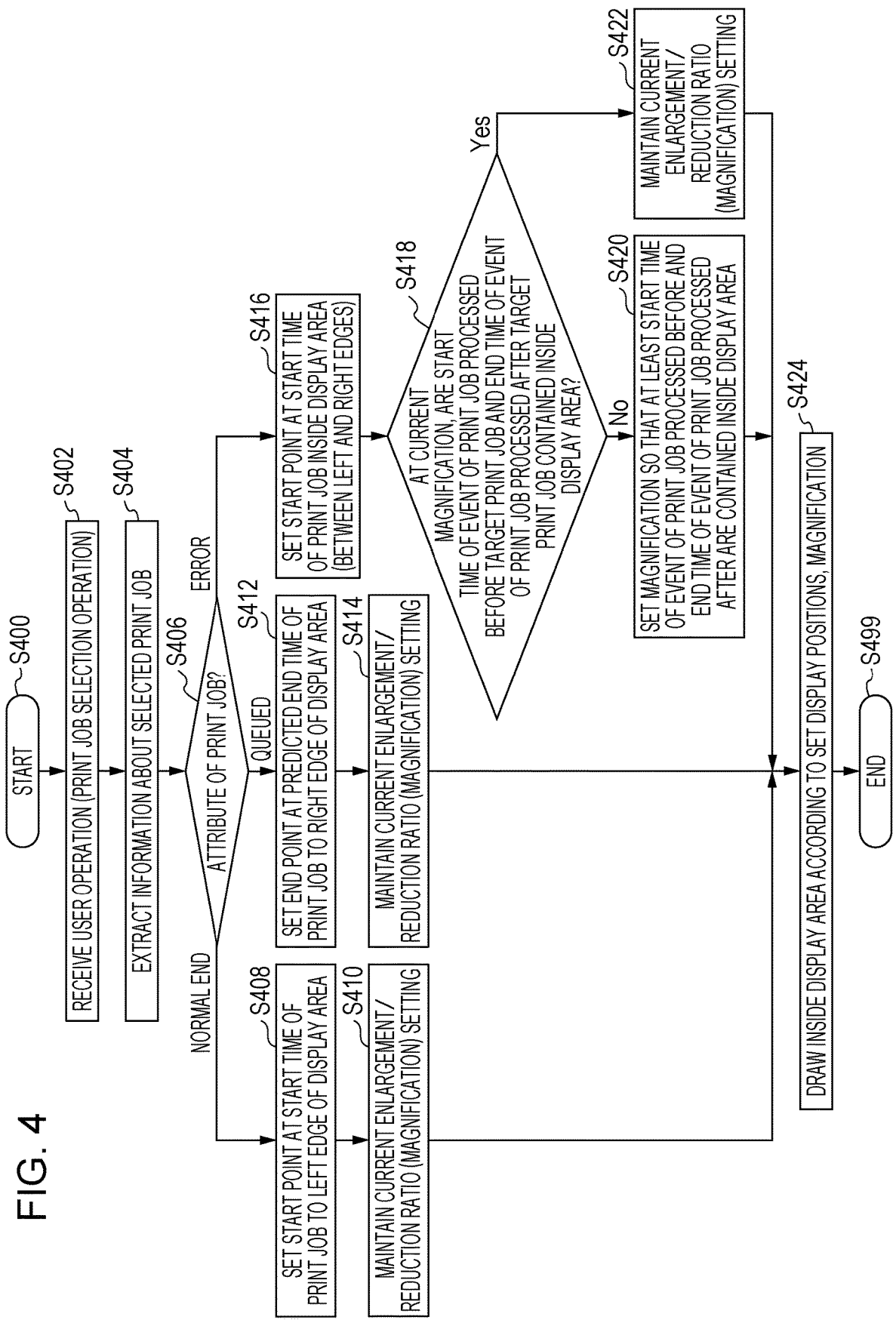
FIG. 4 is a flowchart illustrating an exemplary process according to the exemplary embodiment.

FIG. 4 is a flowchart illustrating an exemplary process according to the exemplary embodiment.

In step S402, a user operation (a print job selection operation) is received.

Figure 5:
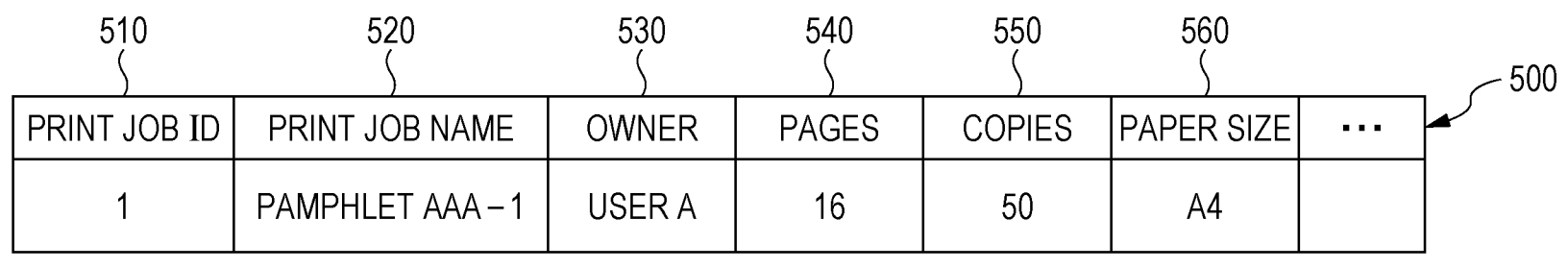

In step S404, information about the selected print job is extracted from the print job information storage module 120. For example, information is extracted from the print job information table 500 and the print job (event) log table 600. FIG. 5 is an explanatory diagram illustrating an exemplary data structure of the print job information table 500. The print job information table 500 includes a print job ID field 510, a print job name field 520, an owner field 530, a pages field 540, a copies field 550, a paper size field 560, and the like. In the exemplary embodiment, the print job ID field 510 stores information (a print job identification (ID)) for uniquely identifying a print job. The print job name field 520 stores the name of the print job. The owner field 530 stores the owner of the print job. Note that herein, the owner refers to the owner of the printed material printed out by the print job. The owner may also be the person who requests the print job. The pages field 540 stores the number of pages of a document in the print job. The copies field 550 stores the number of copies of the print job. The paper size field 560 stores the paper size for the print job. For example, the print job ID field 510 stores "1", the print job name field 520 stores "Pamphlet AAA-1", the owner field 530 stores "User A", the pages field 540 stores "16", the copies field 550 stores "50", and the paper size field 560 stores "A4", or the like.

FIG. 6 is an explanatory diagram illustrating an exemplary data structure of the print job (event) log table 600. The print job (event) log table 600 includes a print job ID field 602 and an event field 604. The event field 604 includes a receive field 606, a generate intermediate form field 616, a generate image field 626, and a print field 636. These correspond to four events during the printing process. Specifically, there is (1) the process of receiving the print job, (2) the process of generating an intermediate form (the process by the intermediate form generation module 175), (3) the process of generating an image (the process by the image generation module 180), and (4) the printing process (the process by the print module 185). Each includes an event ID, a start time, an end time, and result information. Namely, the receive field 606 includes an event ID field 608, a start time field 610, an end time field 612, and a result field 614, the generate intermediate form field 616 includes an event ID field 618, a start time field 620, an end time field 622, and a result field 624, the generate image field 626 includes an event ID field 628, a start time field 630, an end time field 632, and a result field 634, and the print field 636 includes an event ID field 638, a start time field 640, an end time field 642, and a result field 644.

The print job ID field 602 stores the print job ID. The event field 604 stores event-related information (history information). The receive field 606 stores reception events. The event ID field 608 stores information (an event ID) for uniquely identifying an event in the exemplary embodiment. The start time field 610 stores the start time. The end time field 612 stores the end time. The result field 614 stores the result. The generate intermediate form field 616 stores intermediate form generation events. The event ID field 618 stores the event ID. The start time field 620 stores the start time. The end time field 622 stores the end time. The result field 624 stores the result. The generate image field 626 stores image generation events. The event ID field 628 stores the event ID. The start time field 630 stores the start time. The end time field 632 stores the end time. The result field 634 stores the result. The print field 636 stores print events. The event ID field 638 stores the event ID. The start time field 640 stores the start time. The end time field 642 stores the end time. The result field 644 stores the result.

For example, the first row of the print job (event) log table 600 stores "1" in the print job ID field 602, and for the receive field 606, stores "E-001" in the event ID field 608, "XXXX/XX/XX/XX/XX/XX" in the start time field 610, "XXXX/XX/XX/XX/XX/XX" in the end time field 612, "Normal End" in the result field 614, for the generate intermediate form field 616, stores "E-002" in the event ID field 618, "XXXX/XX/XX/XX/XX/XX" in the start time field 620, "XXXX/XX/XX/XX/XX/XX" in the end time field 622, and "Normal End" in the result field 624, for the generate image field 626, stores "E-003" in the event ID field 628, "XXXX/XX/XX/XX/XX/XX" in the start time field 630, "XXXX/XX/XX/XX/XX/XX" in the end time field 632, and "Normal End" in the result field 634, and for the print field 636, stores "E-004" in the event ID field 638, "XXXX/XX/XX/XX/XX/XX" in the start time field 640, "XXXX/XX/XX/XX/XX/XX" in the end time field 642, and "Error (paper jam)" in the result field 644. In other words, for the print job 1, it is indicated that the receiving process, the intermediate form generation process, and the image generation process have ended normally, but in the final printing process, an error (paper jam) has occurred.

The second row of the print job (event) log table 600 stores "2" in the print job ID field 602, and for the receive field 606, stores "E-021" in the event ID field 608, "XXXX/XX/XX/XX/XX/XX" in the start time field 610, "XXXX/XX/XX/XX/XX/XX" in the end time field 612, "Normal End" in the result field 614, for the generate intermediate form field 616, stores "E-022" in the event ID field 618, "XXXX/XX/XX/XX/XX/XX" in the start time field 620, "XXXX/XX/XX/XX/XX/XX" in the end time field 622, and "Normal End" in the result field 624, for the generate image field 626, stores "E-023" in the event ID field 628, "XXXX/XX/XX/XX/XX/XX" in the start time field 630, "XXXX/XX/XX/XX/XX/XX" in the end time field 632, and "Normal End" in the result field 634, and for the print field 636, stores "E-024" in the event ID field 638, the start time field 640 is blank (null), the end time field 642 is blank (null), and stores "to be processed (waiting to print)" in the result field 644. In other words, for the print job 2, it is indicated that the receiving process, the intermediate form generation process, and the image generation process have ended normally, but the final printing process is unprocessed (waiting to print). Note that a predicted start time and end time may also be stored in the start time field 640 and the end time field 642, respectively.

In step S406, the attribute of the print job is determined. In the case of "Normal End", the flow proceeds to step S408, in the case of "Queued", the flow proceeds to S412, and in the case of "Error", the flow proceeds to step S416. For example, it is sufficient to make the determination using the information in the result field 644 (or the result field 614, the result field 624, and the result field 634 other than Normal End) in the print field 636 of the print job (event) log table 600.

In step S408, the start point, which is when the print job starts, is set to the left edge of the display area. For example, it is sufficient to use the information in the start time field 610 in the receive field 606 of the print job (event) log table 600. In this process, the start point on the time axis when displaying events related to the specified print job arranged in a time series in the display area is set according to the attribute of the print job.

In step S410, the current enlargement/reduction ratio (magnification) setting is maintained, and the flow proceeds to step S424. In other words, enlargement/reduction is not executed. Consequently, since the start point on the time axis and the enlargement/reduction ratio are decided, in this process, the end point on the time axis when displaying events related to the specified print job arranged in a time series in the display area is set according to the attribute of the print job. Also, since it is the case in which the attribute of the print job is Normal End, the time axis is shifted so that the start time of the specified print job becomes the left edge of the display area.

Note that if enlargement/reduction is executed every time a print job is selected, in some cases it may be unclear whether or not the targeted print job is the same, and the user may become confused. Accordingly, enlargement/reduction is configured not to be executed, thereby not causing the user to become confused. The same applies to the processes in step S414 and step S422.

In step S412, the end point, which is when the print job is predicted to end, is set to the right edge of the display area. As described earlier, it is sufficient to compute the predicted end time by using information inside the print job (such as the number of pages), the schedule (print order), the printing speed of the printer, and the like. In this process, the end point on the time axis when displaying events related to the specified print job arranged in a time series in the display area is set according to the attribute of the print job.

In step S414, the current enlargement/reduction ratio (magnification) setting is maintained, and the flow proceeds to step S424. Consequently, since the end point on the time axis and the enlargement/reduction ratio are decided, in this process, the start point on the time axis when displaying events related to the specified print job arranged in a time series in the display area is set according to the attribute of the print job. Also, since it is the case in which the attribute of the print job is Queued, the time axis is shifted so that the predicted end time of the specified print job becomes the right edge of the display area.

In step S416, the start point, which is when the print job starts, is set inside the display area (between the left edge and the right edge). For example, it is sufficient to use the information in the start time field 610 in the receive field 606 of the print job (event) log table 600. In this process, the start point on the time axis when displaying events related to the specified print job arranged in a time series in the display area is set according to the attribute of the print job. Additionally, since it is the case in which the attribute of the print job is Error, the time axis is shifted so that the start time of the specified print job is in between the left edge and the right edge of the display area. For example, the middle of an event of the print job may be moved to align with the middle of a graphical area 870, and in addition, the entirety of the print jobs before and after the targeted print job may be moved to be contained inside the graphical area 870.

In step S418, it is determined whether or not the "start time of an event of a print job processed before the targeted print job" and the "end time of an event of a print job processed after the targeted print job" at the current magnification are contained inside the display area. If contained, the flow proceeds to step S422, otherwise (if not contained) the flow proceeds to step S420.

In step S420, the magnification is set so that at least the start time of an event of a print job processed before (obviously, the end time is also included), and additionally, the end time of an event of a print job processed after (obviously, the start time is also included) are contained inside the display area, and the flow proceeds to step S424. In this process, since it is the case in which the attribute of the print job is Error, the time axis is reduced or enlarged so that the event start time of the print job processed before the current print job (the print job in which an error has occurred) and the event end time of the print job processed after the current print job (the print job in which an error has occurred) are contained inside the display area.

Note that the enlargement/reduction (magnification) is changed because knowing the print job which may have caused the error or a print job which is affected by the error may be more beneficial than knowing the targeted print job (the print job in which the error has occurred). In other words, the time axis is enlarged/reduced so that one is able to grasp the overall print jobs before and after the targeted print job.

In step S422, the current enlargement/reduction ratio (magnification) setting is maintained, and the flow proceeds to step S424.

In step S424, drawing is executed inside the display area in accordance with the set display position and magnification. In other words, the display position of each event related to the targeted print job, and each event related to print jobs being displayed before or after the print job in the display area is controlled in accordance with the set start point and/or end point.

The processing according to the flowchart illustrated in the example of FIG. 4 may also follow the print job type/display position/display range table 700. In other words, the drawing rule decision module 150 may extract the print job type/display position/display range table 700 inside the drawing rule storage module 155, and the display position setting module 135, the display range setting module 140, and the enlargement/reduction ratio decision module 145 may execute processing following the print job type/display position/display range table 700.

FIG. 7 is an explanatory diagram illustrating an exemplary data structure of the print job type/display position/display range table 700. The print job type/display position/display range table 700 includes a print job type field 710, a display position field 720, and a display range field 730. The print job type field 710 stores the type of the print job. The display position field 720 stores the display position. The display range field 730 stores the display range.

For example, the first row of the print job type/display position/display range table 700 stores "job to be processed (future prediction display job)" in the print job type field 710, "align event end time with display range end time (right edge of display area)" in the display position field 720, and "match with range from start to end of selected job" in the display range field 730. The second row stores "error job" in the print job type field 710, "align event with center of display range" in the display position field 720, and "match with range from event start time of earlier job to event end time of later job" in the display range field 730. The third row stores "normal end job" in the print job type field 710, "align event start time with display range start time (left edge of display area)" in the display position field 720, and "match with range from start to end of events of job" in the display range field 730.

Figure 8:
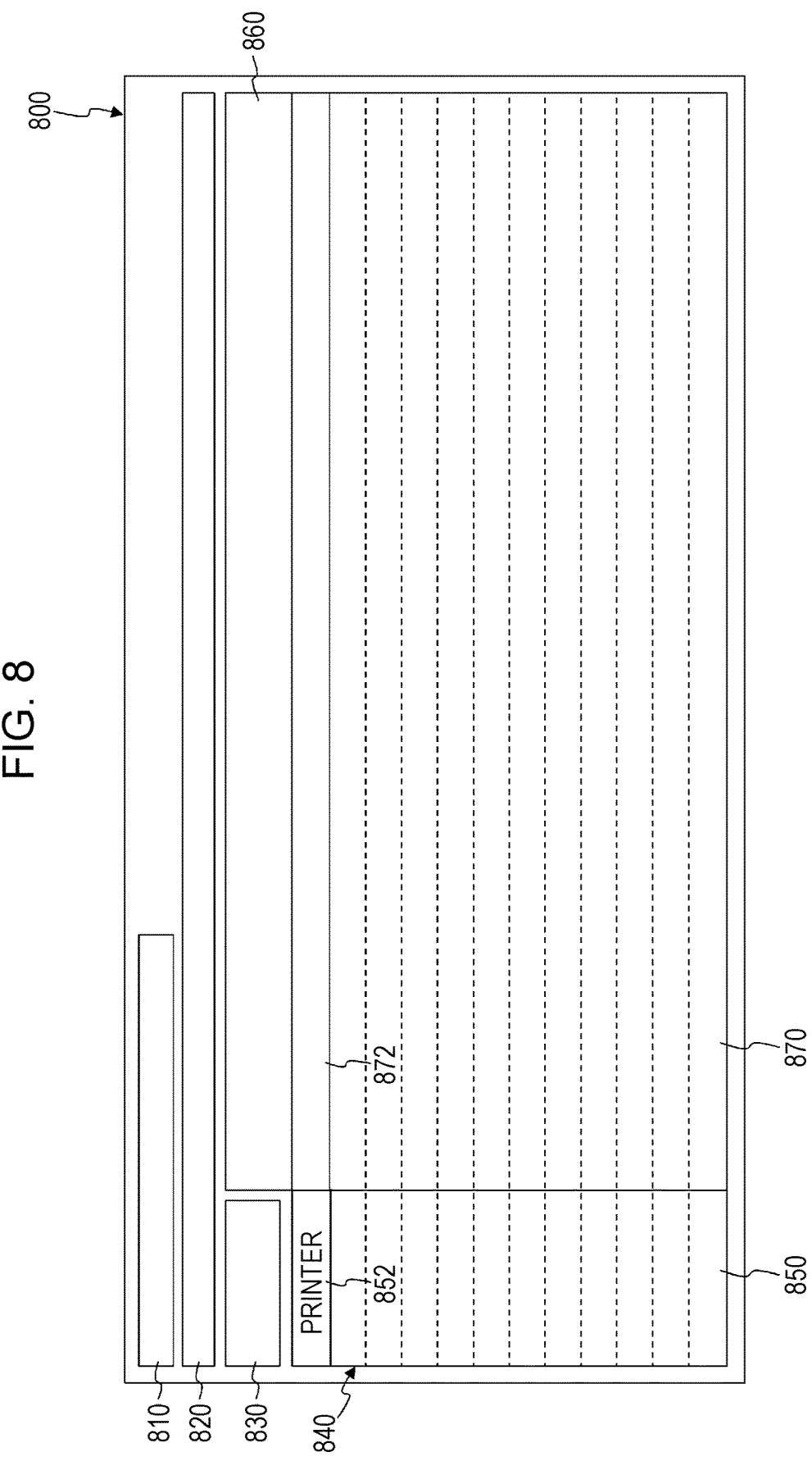
FIG. 8 is an explanatory diagram illustrating an exemplary display according to the exemplary embodiment.

The example of FIG. 8 will be used to describe the display area. FIG. 8 is an explanatory diagram illustrating an exemplary display according to the exemplary embodiment. The display area corresponds to the graphical area 870.

On a screen 800, a target period setting field 810, a time series display area 820, a search expression reception field 830, and a time series display area 840 are displayed.

The target period setting field 810 is an area that specifies the time range of print jobs to target. For example, the period of print jobs to target is specified by a start day and an end day. In addition, the time range may also be specified by a start day and "10 minutes, 30 minutes, 1 hour, 12 hours, 1 day, 1 week, all", and the like. For example, the single day of "Mar. 7, 2017" may be set as the period.

Inside the time series display area 820, a time range inside the period specified in the target period setting field 810 is displayed. In the example described above, a time axis from 00:00 to 24:00 on "Mar. 7, 2017" is displayed.

Inside the search expression reception field 830, an area for searching for print jobs (a field for inputting a search expression including a search word or the like" is displayed.

The time series display area 840 is divided into a list area 850, a time axis display area 860, and the graphical area 870.

The time axis display area 860 is an area that displays a time axis with respect to the graphical area 870. Other than the time axis, the specified time range or the like may also be displayed.

The first row inside the time series display area 840 (a printer name display area 852 which is the first row of the list area 850, and a printer process graphical area 872 which is the first row of the graphical area 870) is an area indicating the processing content of the printer.

The second and subsequent rows inside the time series display area 840 (the second and subsequent rows of the list area 850, and the second and subsequent rows of the graphical area 870) are areas indicating the processing content of print jobs. Note that the second and subsequent rows inside the time series display area 840 may be sorted. In the example illustrated in the diagram, an example of sorting in descending order by end time is illustrated. In other words, new print jobs are displayed on the top, while old print jobs are displayed on the bottom.

In the printer name display area 852, the name of the printer is displayed.

In the printer process graphical area 872, processing content (events) in the printer is displayed graphically. For example, elements (rectangles) indicating "Receiving", "Generating intermediate form document data", "Generating data for printing", "Printing", "Waiting for user operation", and the like are color-coded and displayed. Additionally, processes may also be color-coded and displayed according to the results of the processes (such as Normal End, Warning, and Error).

On the second and subsequent rows of the list area 850, print jobs inside the period specified by the scroll bar (display time band) 910 (additionally, in the case in which the search expression reception field 830 is being used, print jobs returned by a search according to the search expression received in the search expression reception field 830) are displayed. For example, print job names, results, and the like may be listed.

On the second and subsequent rows of the graphical area 870, the processing content in the print job is displayed graphically. For example, elements (rectangles) indicating "Receiving", "Generating intermediate form document data", "Generating data for printing", "Printing", "Waiting for user operation", and the like are color-coded and displayed. Additionally, processes may also be color-coded and displayed according to the results of the processes (such as Normal End, Warning, and Error).

FIG. 9 is an explanatory diagram illustrating an exemplary display according to the exemplary embodiment. A specific example is displayed inside the screen 800 illustrated in the example of FIG. 8.

A time-series print history of print jobs is displayed visually (timeline function).

In the target period setting field 810, the start time and end time of the print history of print jobs is set, and on the screen 800, the events of print jobs occurring during that period and the status of the printer are visualized and displayed in a time series.

Note that by performing an operation on the target period setting field 810, the user is able to display a list of print jobs processed inside an arbitrary time range between the start time and the end time in the list area 850. Additionally, the time range may be changed arbitrarily by the user in the target period setting field 810.

Additionally, by sliding the scroll bar (display time band) 910 on the time series display area 820, the user is able to change the time range inside the graphical area 870 between the start day and the end day, while keeping the specified time range. The scroll bar (display time band) 910 will be described in detail later using the example of FIG. 11.

Figure 10:
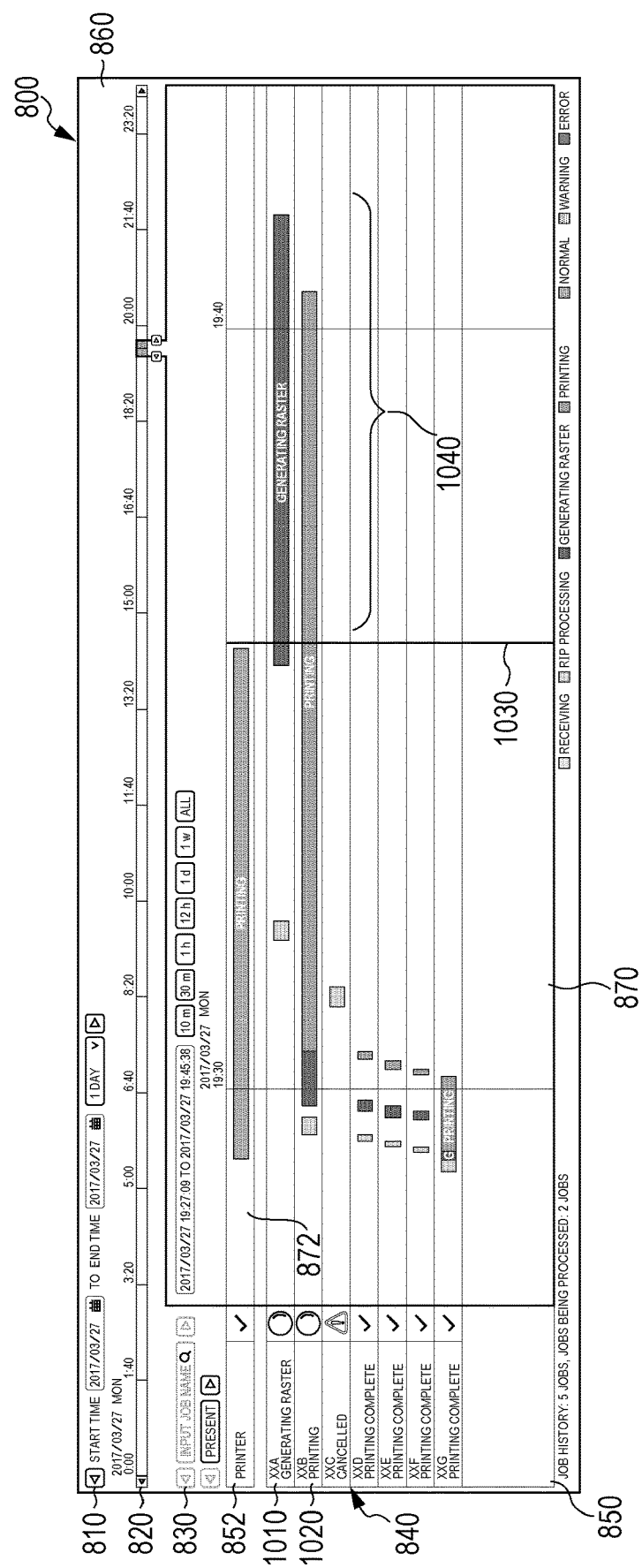
FIG. 10 is an explanatory diagram illustrating an exemplary display according to the exemplary embodiment.

FIG. 10 is an explanatory diagram illustrating an exemplary display according to the exemplary embodiment.

In the example of FIG. 10, a current time display line 1030 is displayed inside the graphical area 870. The left side of the current time display line 1030 is a past history, while the right side (future prediction display area 1040) of the current time display line 1030 indicates future predictions. Obviously, for the past before the current time, it is sufficient to use the print history of print jobs. Also, for the future after the current time, it is sufficient to compute future print jobs according to the schedule. Specifically, prediction information may be computed in accordance with print data generating processes based on print job settings (the processing speed of the intermediate form generation module 175 and the image generation module 180), the printing speed of the printer (the printing speed of the print module 185), and finishing processes (such as hole-punching, binding (stapling), and folding). Other than the above, the start time and the end time of each print job may be computed from the start time, the print job quantity (such as the number of pages, the paper size, and the printing type (color or black and white printing)), the printing order, and the like.

Figure 11:
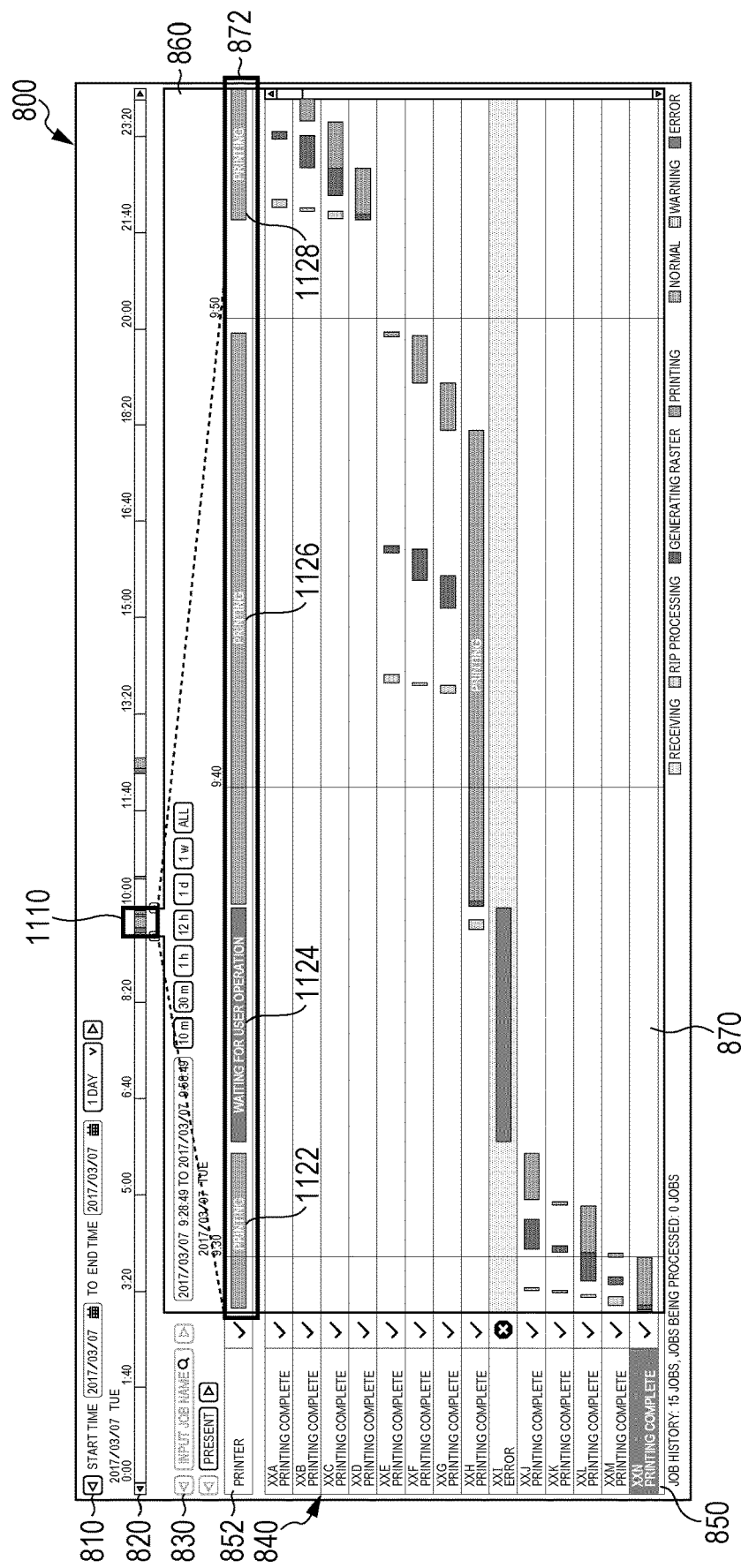
FIG. 11 is an explanatory diagram illustrating an exemplary display according to the exemplary embodiment.

FIG. 11 is an explanatory diagram illustrating an exemplary display according to the exemplary embodiment.

By sliding (moving) a display time band 1110 on the time series display area 820, it is possible to change the display time band. The content inside the graphical area 870 (including the printer process graphical area 872) is displayed in correspondence with the positioned time band of the display time band 1110. The display time band 1110 may be varied by user operations.

In the time series display area 820, a time axis from 00:00 to 24:00 on Mar. 7, 2017 (Tue) is illustrated. In other words, the status of the printer between the start day and the end day is displayed on the time series display area 820.

By the display time band 1110 inside the time series display area 820, the period (30 minutes) from 9:28:49 to 9:58:49 on Mar. 7, 2017 (Tue) is specified, and the details of the period are displayed in the graphical area 870. In other words, the user is able to slide the display time band 1110 while watching the status of the printer on the time series display area 820, and change the time range inside the graphical area 870.

Note that the details of the display time band 1110 are displayed in the printer process graphical area 872. To put it another way, a reduced version of the printer process graphical area 872 is displayed inside the display time band 1110. Inside the printer process graphical area 872, there are a Printing presentation bar 1122, a Waiting for User Operation presentation bar 1124, a Printing presentation bar 1126, and a Printing presentation bar 1128 indicating the status of the printer.

Figure 12A:
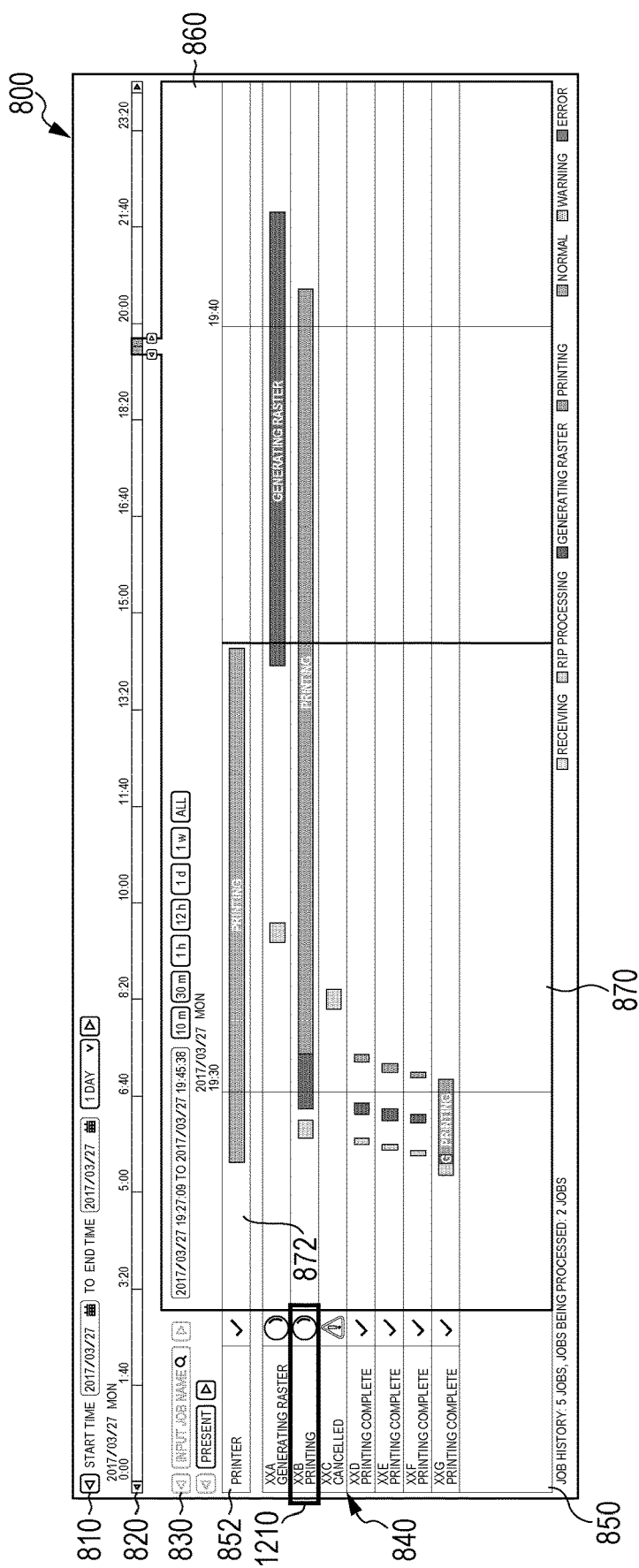
FIGS. 12A and 12B are explanatory diagrams illustrating an exemplary display according to the exemplary embodiment.
Figure 12B:
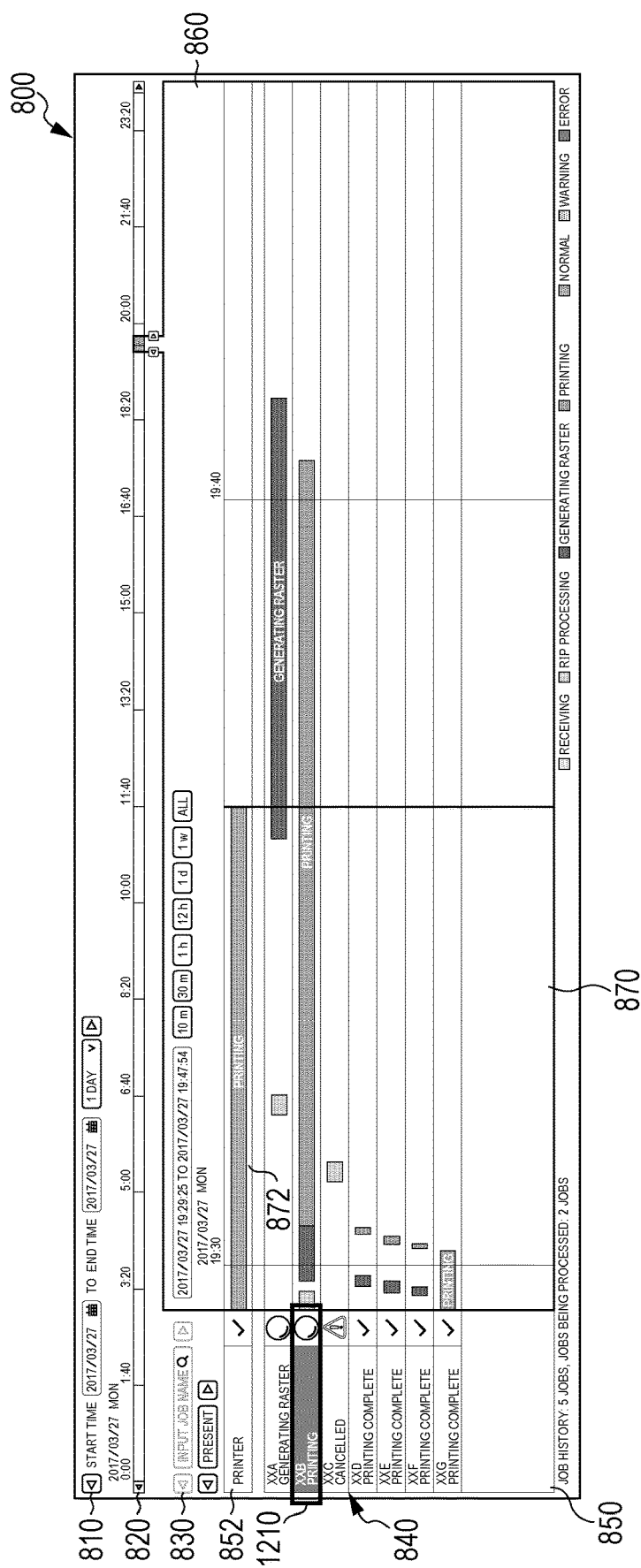

FIGS. 12A and 12B are explanatory diagrams illustrating an exemplary display according to the exemplary embodiment.

FIG. 12A displays the processing content in the time period from 19:27:09 on Mar. 27, 2017 to 19:45:38 on Mar. 27, 2017.

Herein, in the case in which a target print job 1210 is selected by a user operation, a display as illustrated by the example in FIG. 12B is presented. In other words, scrolling is executed so that the event of the target print job 1210 becomes the start time of the graphical area 870. Specifically, the processing start time of the target print job 1210, namely 19:29:25 on Mar. 27, 2017 is displayed at the left edge inside the graphical area 870. Obviously, the graphical area 870 for the other print jobs is displayed with 19:29:25 on Mar. 27, 2017 at the left edge. In other words, the entirety of the graphical area 870 is displayed shifted to the left.

With this arrangement, even if the event of a print job displayed inside the list area 850 lie outside the graphical area 870, by selecting the print job, the event of the print job is scrolled and displayed, thereby making confirmation possible.

Figure 13A:
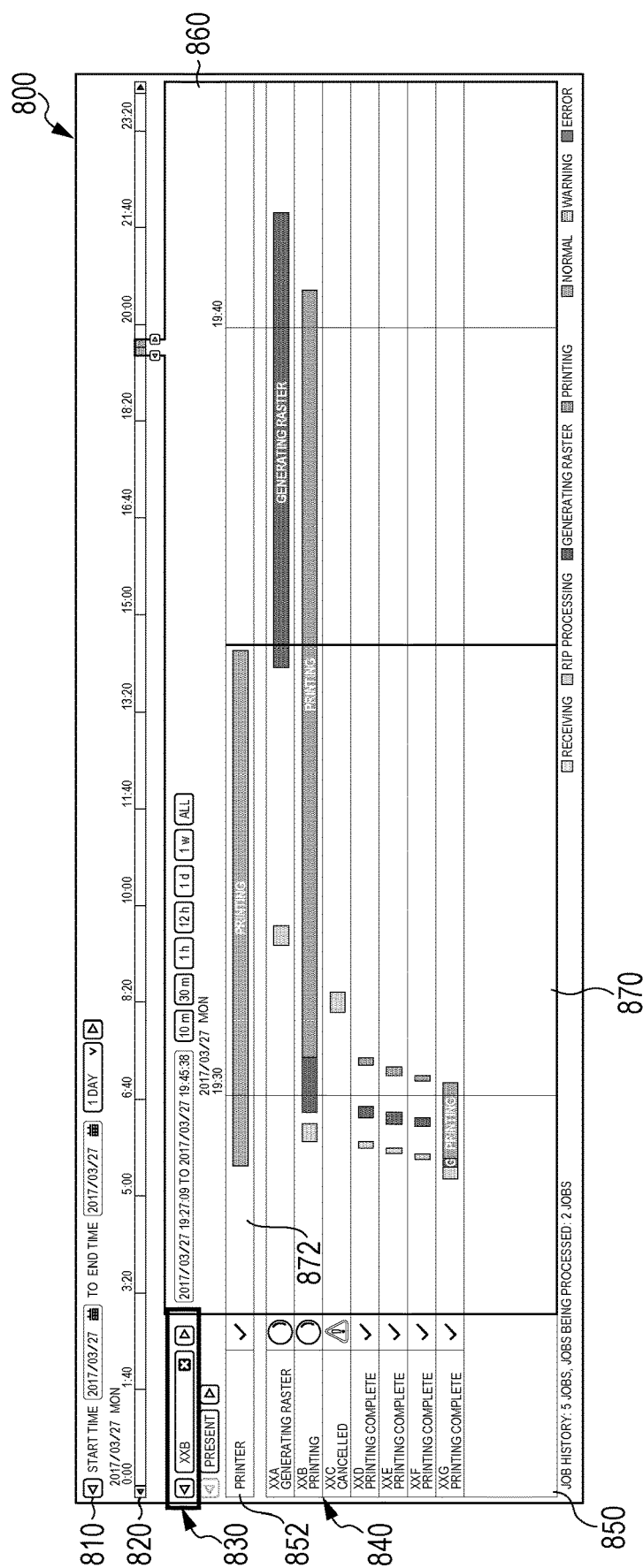
FIGS. 13A to 13C are explanatory diagrams illustrating an exemplary display according to the exemplary embodiment.
Figure 13B:
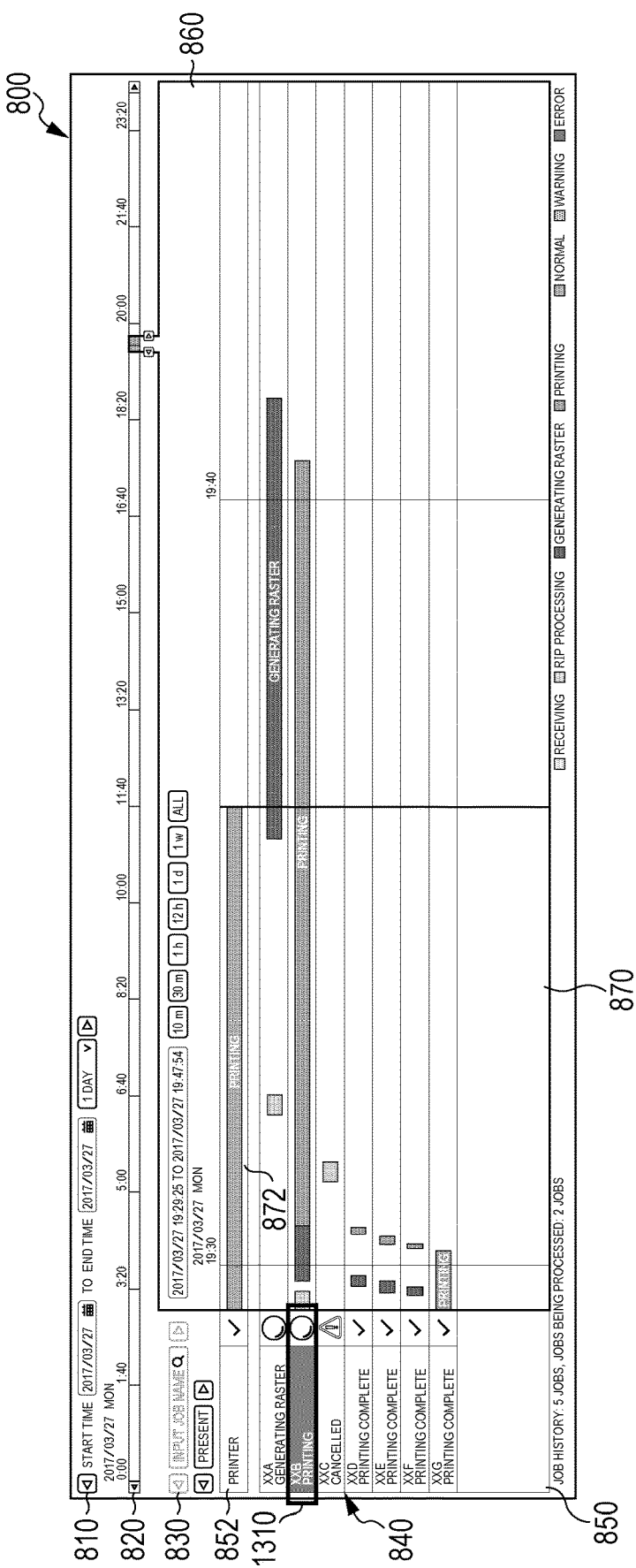
Figure 13C:
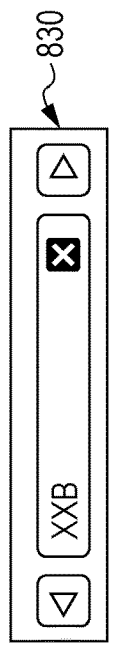

FIGS. 13A to 13C are explanatory diagrams illustrating an exemplary display according to the exemplary embodiment.

On the screen 800, print jobs may be searched by using the search expression reception field 830. In other words, searching is possible with respect to arbitrary parameters (such as the print job name and the end status) of a print job. In the list area 850, the display jumps to the print job returned by the search (a jump refers to creating a list including the print job from the search result). Scrolling is executed so that the event start time of the print job becomes the start time of the display range.

For example, in the case of searching for "XXB" in the search expression reception field 830 (see FIG. 13C) of FIG. 13A, a print job including "XXB" in the print job name is returned by the search. Additionally, as illustrated in the example of FIG. 13B, the search result, namely the search result print job 1310, is highlighted inside the list area 850, and scrolling is executed so that the event start time of the search result print job 1310 becomes the left edge of the graphical area 870.

Note that, following the flowchart illustrated in the example of FIG. 4, the display position of an event related to the search result print job 1310 may also be changed in accordance with the attribute of the search result print job 1310.

Also, in the case in which multiple print jobs are returned as search hits in the search result, by pushing triangular buttons (a left-facing triangular button and a right-facing triangular button) inside the search expression reception field 830 illustrated in the example of FIG. 13C, it is possible to cause the next search result print job to be displayed.

Figure 14:
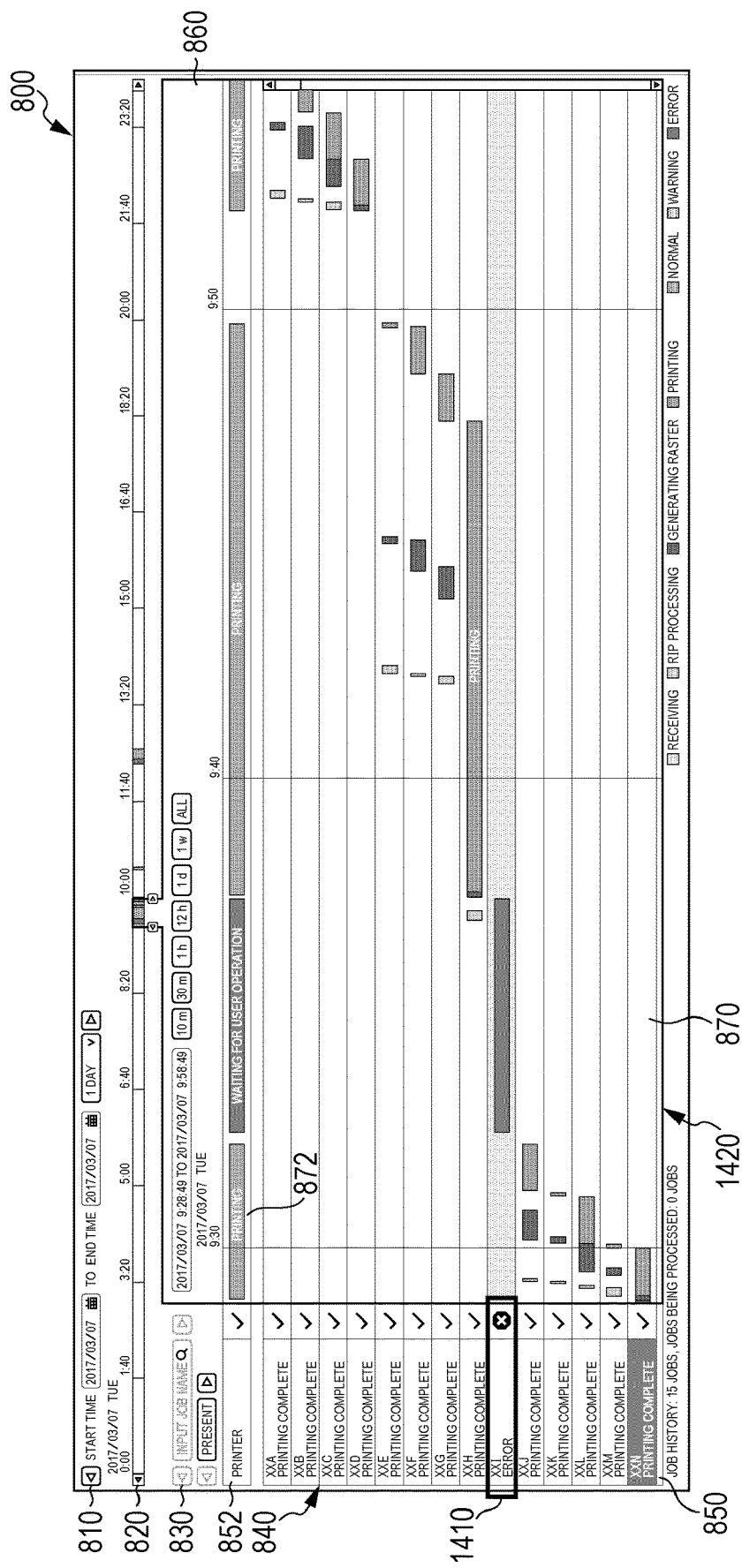
FIG. 14 is an explanatory diagram illustrating an exemplary display.

FIG. 14 is an explanatory diagram illustrating an exemplary display for comparison.

In the case in which the event start point of the selected print job is always aligned with the left edge of the graphical area 870 irrespectively of the attribute of the print job (in other words, in the case in which the exemplary embodiment is not adopted), print jobs before the selected print job are not displayed inside the graphical area 870. Specifically, as illustrated in the example of FIG. 14, in the case of selecting a print job in which an error has occurred as a target print job 1410, events in the previous print job (the print job that is one row lower on the list area 850) lie outside the display range.

However, in the case of a printing job that is scheduled to be processed (a print job predicted to occur in the future), the importance of the end time may be higher than the event start time, and thus it is beneficial to also display the end time inside the graphical area 870. Also, in the case of an error job, it is also desirable to grasp the status of the print jobs before and after the occurrence of the error.

Figure 15A:
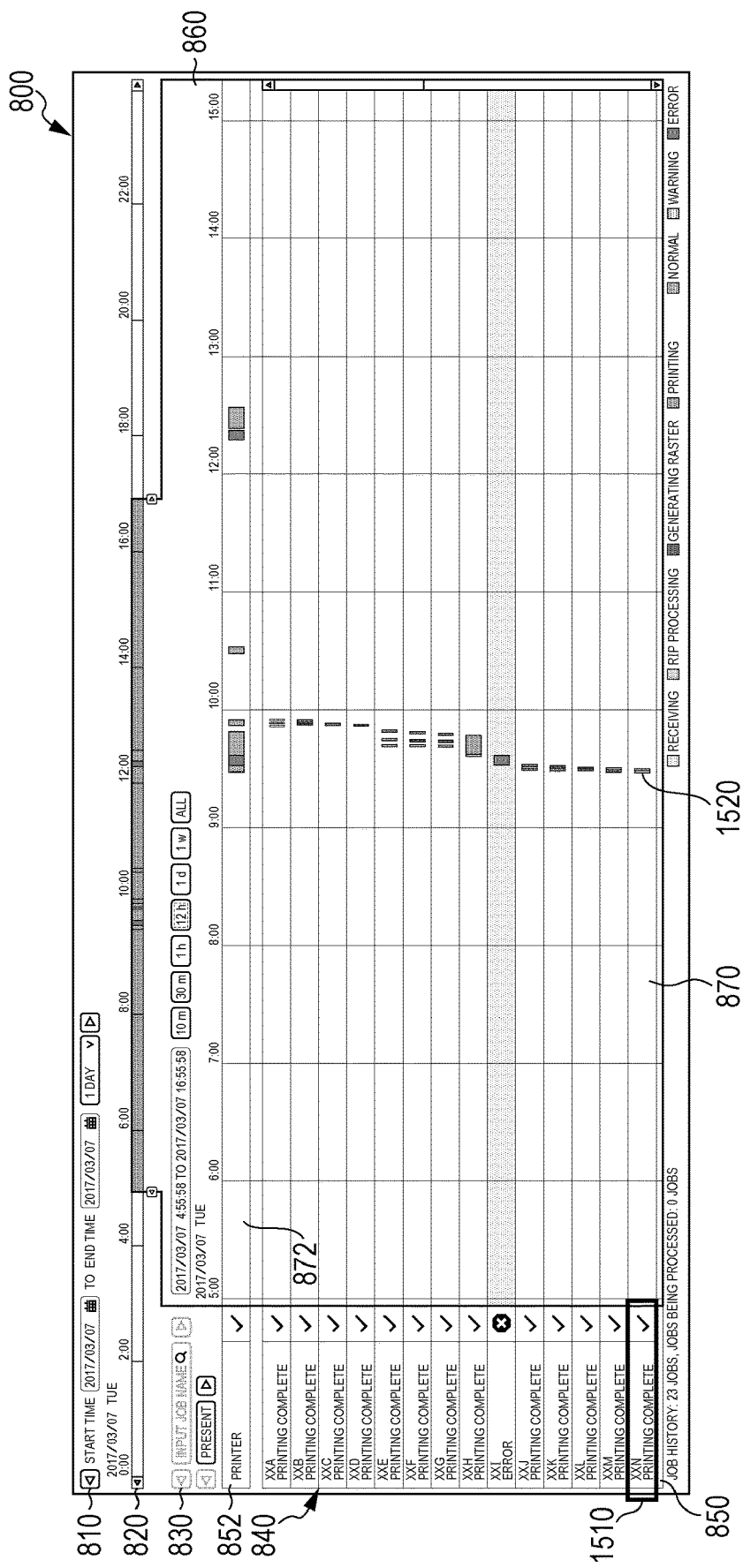
FIGS. 15A and 15B explanatory diagrams illustrating an exemplary display.
Figure 15B:
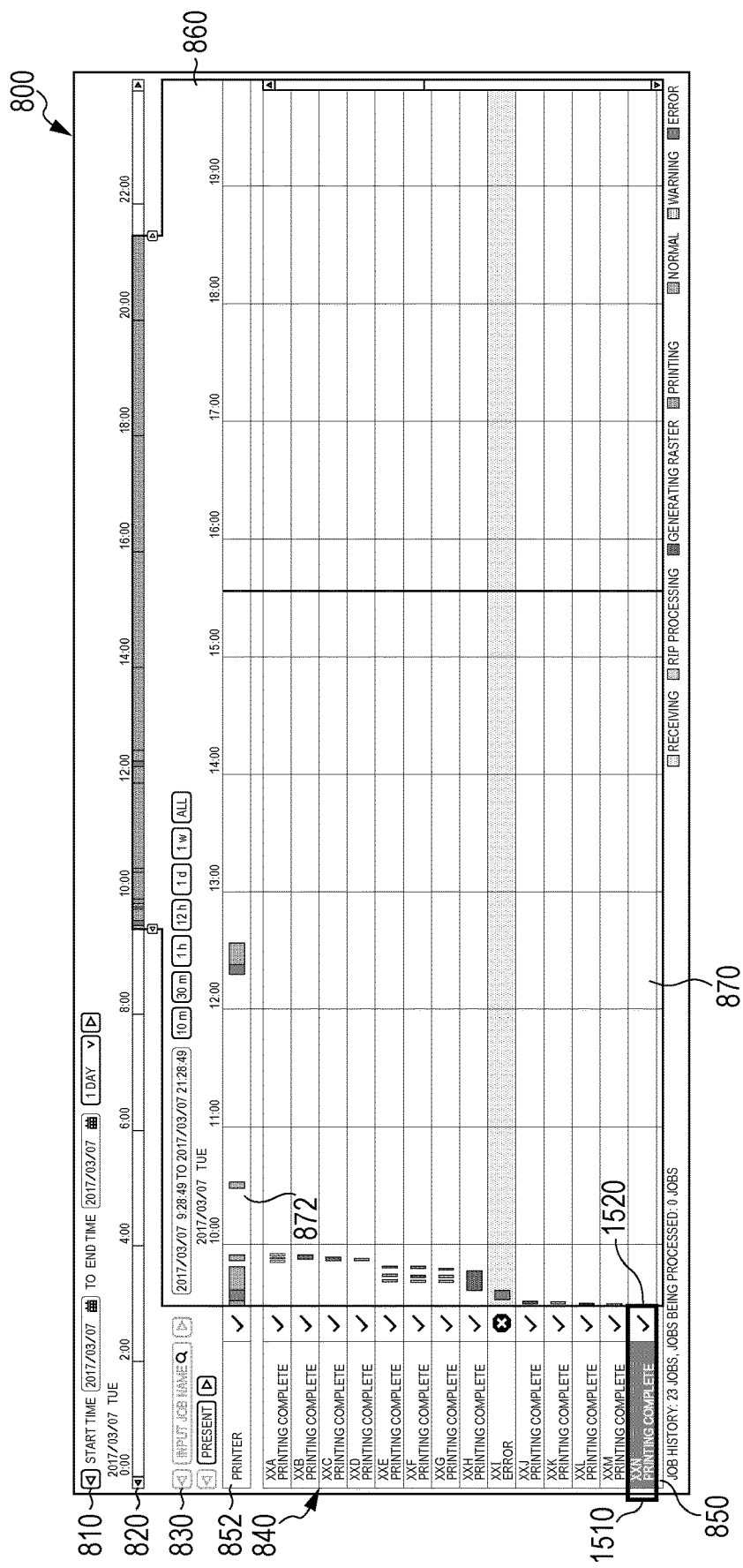

FIGS. 15A and 15B are explanatory diagrams illustrating an exemplary display for comparison.

An example is illustrated in which the display range (display scale) is not changed even if a print job is selected. As illustrated in the example of FIG. 15A, when displaying events over a wide time period inside the graphical area 870, even if a print job 1510 of an event 1520 that ends in a short amount of time is selected, the event 1520 is simply moved to the left edge as illustrated in the example of FIG. 15B, and it is difficult to judge what is occurring. Particularly, in the case in which an error has occurred in the print job 1510, it is beneficial to enlarge or reduce the display so that an overview of the print job before and the print job after the print job 1510 is understandable.

Figure 16:
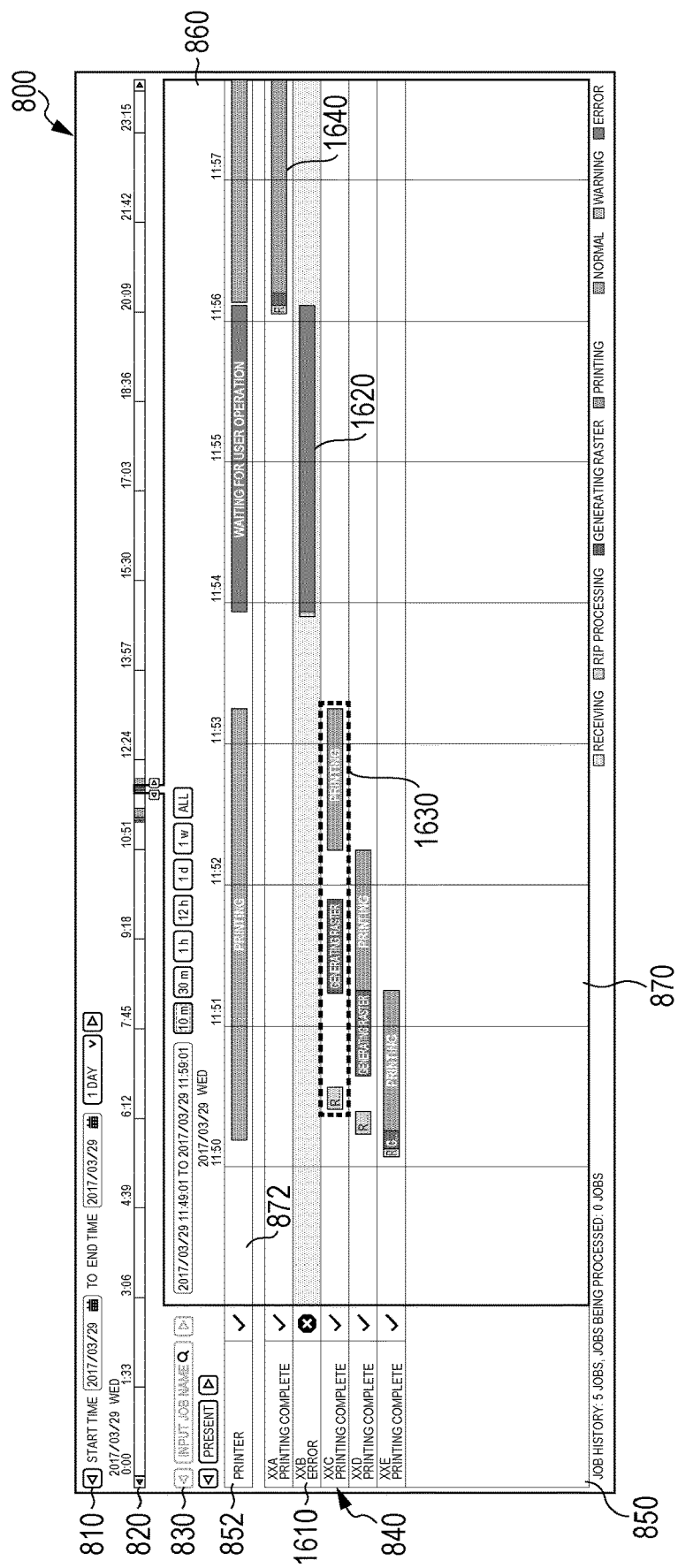
FIG. 16 is an explanatory diagram illustrating an exemplary display according to the exemplary embodiment.

FIG. 16 is an explanatory diagram illustrating an exemplary display according to the exemplary embodiment.

A print job 1610 inside the list area 850 is a print job in which an error has occurred. In this case, the user wants to grasp an overview of a pre-error event group 1630 of the print job that has ended before and a post-error event group 1640 of print job occurring after the print job 1610 (event 1620).

Figure 17:
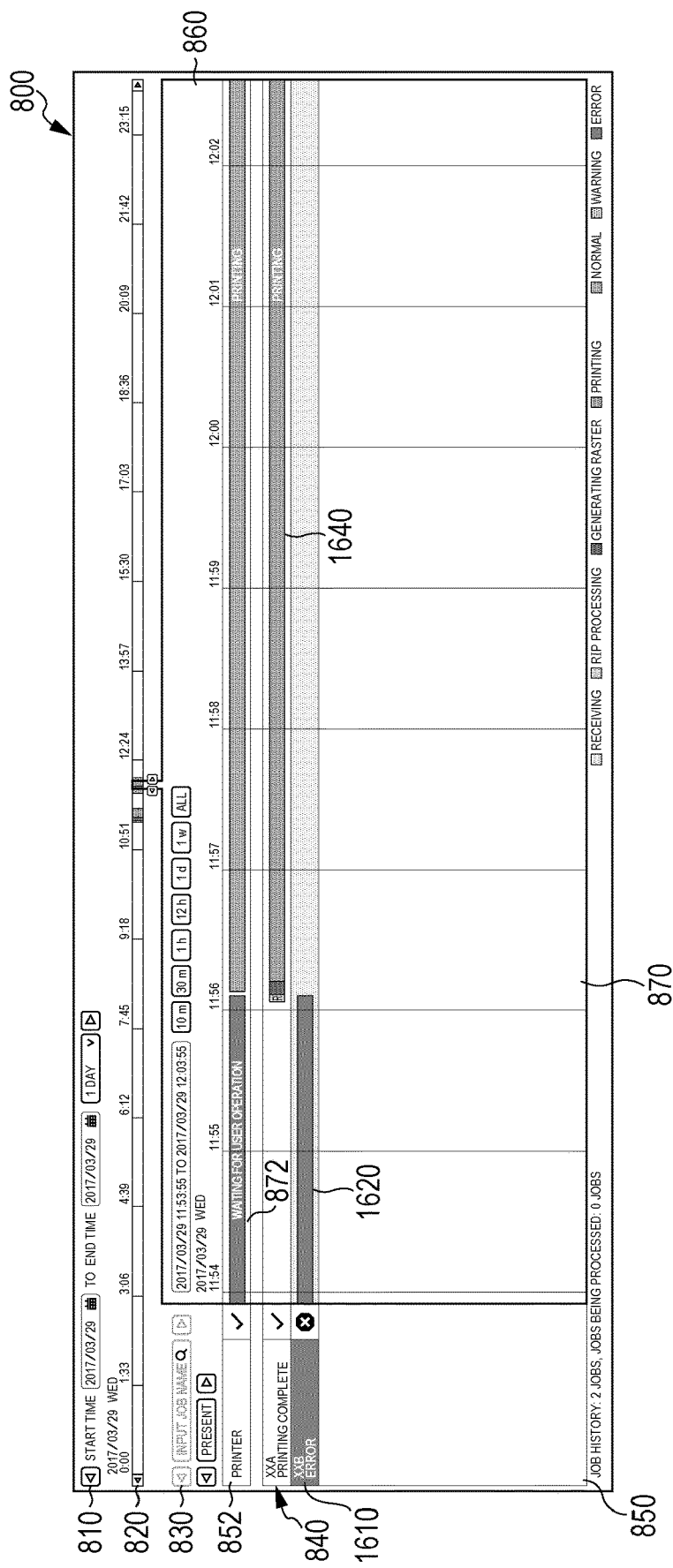
FIG. 17 is an explanatory diagram illustrating an exemplary display.

FIG. 17 is an explanatory diagram illustrating an exemplary display for comparison.

In the case in which the event start point of the selected print job is always aligned with the left edge of the graphical area 870 irrespectively of the attribute of the print job (in other words, in the case in which the exemplary embodiment is not adopted), if the print job 1610 inside the list area 850 is selected, as illustrated in the example of FIG. 17, the pre-error event group 1630 of the previous print job (the print job that is one row lower on the list area 850) lies outside the display range.

Figure 18:
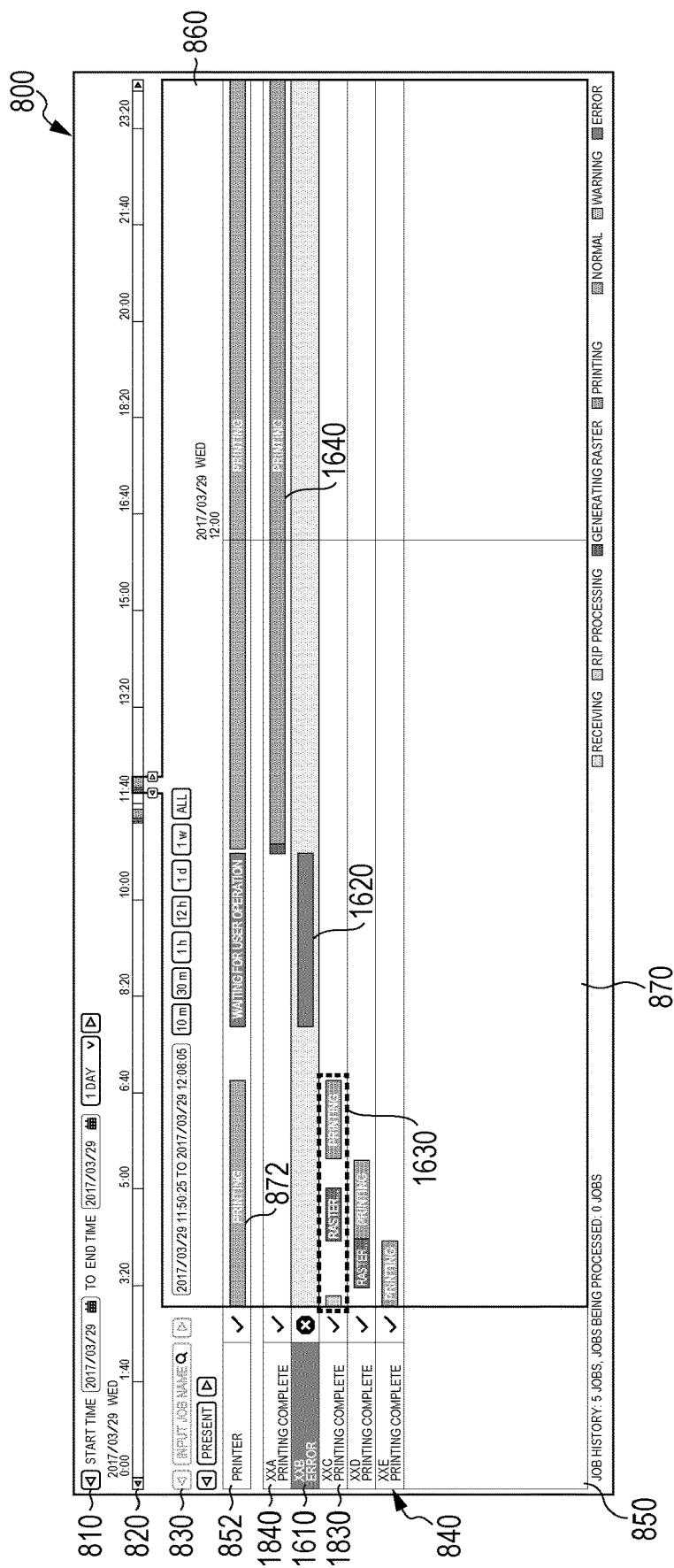
FIG. 18 is an explanatory diagram illustrating an exemplary display according to the exemplary embodiment.

FIG. 18 is an explanatory diagram illustrating an exemplary display according to the exemplary embodiment.

In the exemplary embodiment, if the print job 1610 inside the list area 850 is selected, as illustrated in the example of FIG. 18, a slide process and an enlargement/reduction process are executed so that the start point (event start time) of the pre-error event group 1630 of a pre-error print job 1830 earlier (one row lower on the list area 850) than the print job 1610 is set to the left edge of the graphical area 870, and so that the end point (event end time) of the post-error event group 1640 of a post-error print job 1840 later (one row higher on the list area 850) than the print job 1610 is set to the right edge of the graphical area 870.

Figure 19:
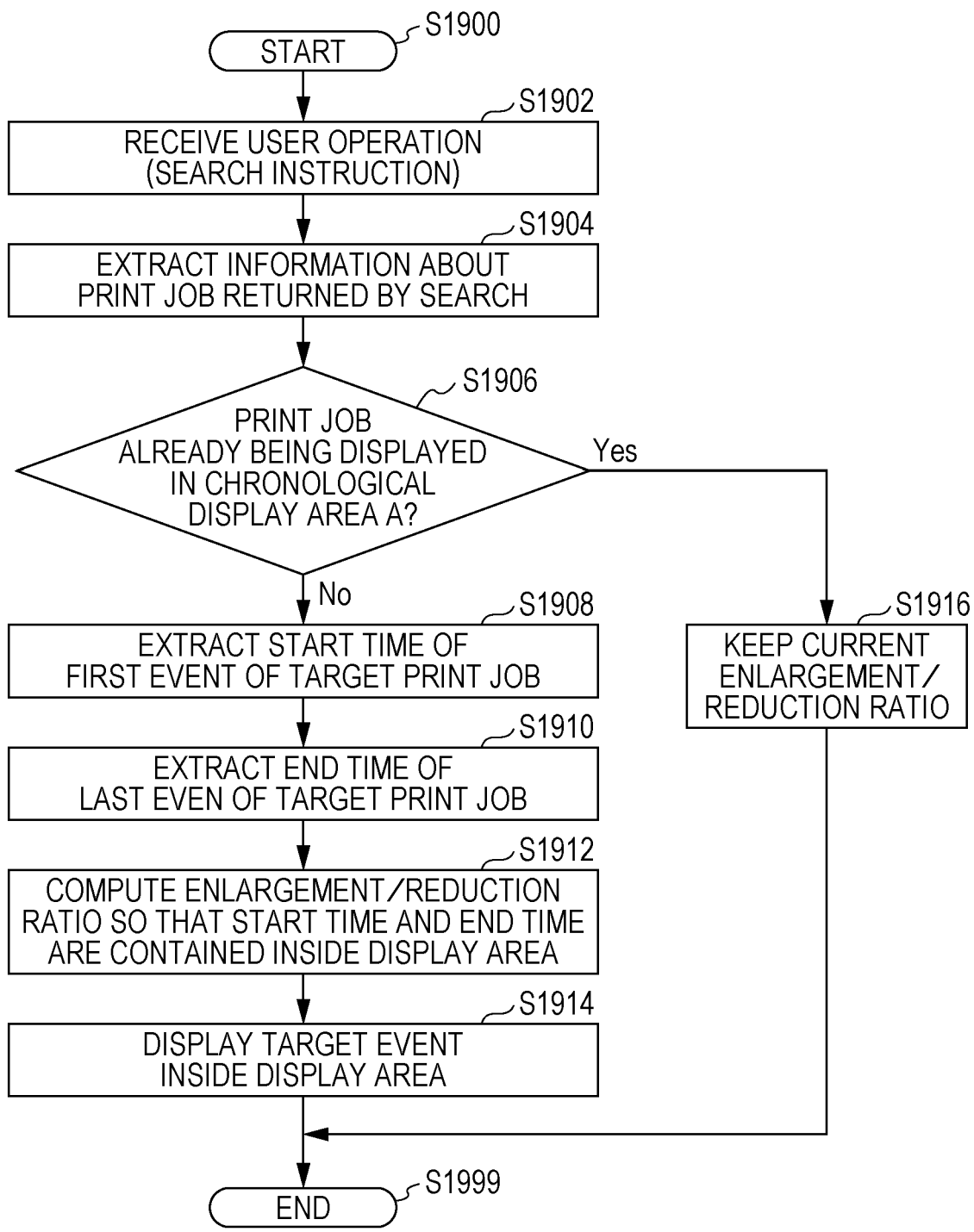
FIG. 19 is a flowchart illustrating an exemplary process according to the exemplary embodiment.

FIG. 19 is a flowchart illustrating an exemplary process according to the exemplary embodiment.

In step S1902, a user operation (search instruction) is received.

In step S1904, information about the print jobs returned by the search is extracted. In other words, print jobs satisfying the search condition designated to select a print job is specified.

In step S1906, it is determined whether or not the print job is already being displayed in the time series display area 840 (or the list area 850). If the print is already being displayed in the time series display area A, the flow proceeds to step S1916. Otherwise, the flow proceeds to step S1908. In other words, in the case in which the print job extracted in step S1904 is not being displayed in the graphical area 870, a process of deciding the enlargement/reduction ratio is executed (the process in S1908 and thereafter in the "No" case). Additionally, in the case in which the print job extracted in step S1904 is already being displayed in the graphical area 870, a process of deciding the enlargement/reduction ratio is not executed (the process in S1916 in the "Yes" case).

In step S1908, the start time of the first event of the target print job is extracted.

In step S1910, the end time of the last event of the target print job is extracted.

In step S1912, the enlargement/reduction ratio is computed so that the start time and the end time are contained inside the display area. In other words, the enlargement/reduction ratio on the time axis is decided so that when the events related to the print jobs satisfying the search condition are displayed in the graphical area 870 arranged in a time series, the start time of the first event and the end time of the last event are contained in the graphical area 870.

In step S1914, the target events are displayed inside the display area. In other words, the display of a line of events related to the print jobs satisfying the search condition, enlarged or reduced by the decided enlargement/reduction ratio, in the graphical area 870 is controlled.

In step S1916, the current enlargement/reduction ratio is maintained.

Also, after step S1914 and step S1916, the process of step S406 and thereafter in the flowchart illustrated in the example of FIG. 4 may be executed. However, the print job to target becomes the print job returned by the search.

The process according to the flowchart illustrated in the example of FIG. 19 may also follow the selection method/display position/display range table 2000. In other words, the drawing rule decision module 150 may extract the selection method/display position/display range table 2000 inside the drawing rule storage module 155, and the display position setting module 135, the display range setting module 140, and the enlargement/reduction ratio decision module 145 may execute processing following the selection method/display position/display range table 2000.

FIG. 20 is an explanatory diagram illustrating an exemplary data structure of the selection method/display position/display range table 2000.

The selection method/display position/display range table 2000 includes a print job selection method field 2010, a display position field 2020, and a display range field 2030. The print job selection method field 2010 stores the print job selection method. The display position field 2020 stores the display position. The display range field 2030 stores the display range.

For example, the first row of the selection method/display position/display range table 2000 stores "jump selection to print job returned by print job search" in the print job selection method field 2010, "align event start time with display range start time" in the display position field 2020, and "match with range from start to end of print job" in the display range field 2030. The second row stores "select arbitrary print job from list" in the print job selection method field 2010, "align event start time with display range start time" in the display position field 2020, and "do not automatically change display range" in the display range field 2030.

The display position field 2020 is set to "align event start time with display range start time", but the display position field 720 of the print job type/display position/display range table 700 may also be used to change the display position according to the type of print job.

The first row of the display range field 2030 ("match with range from start to end of print job") is because in the case in which a print is returned by the search, it is desirable to focus on the print job of the search result.

The second row of the display range field 2030 ("do not automatically change display range") is because in the case in which a print job is selected from among print jobs currently being listed, it is desirable to also check the before/after relationships.

Figure 21:
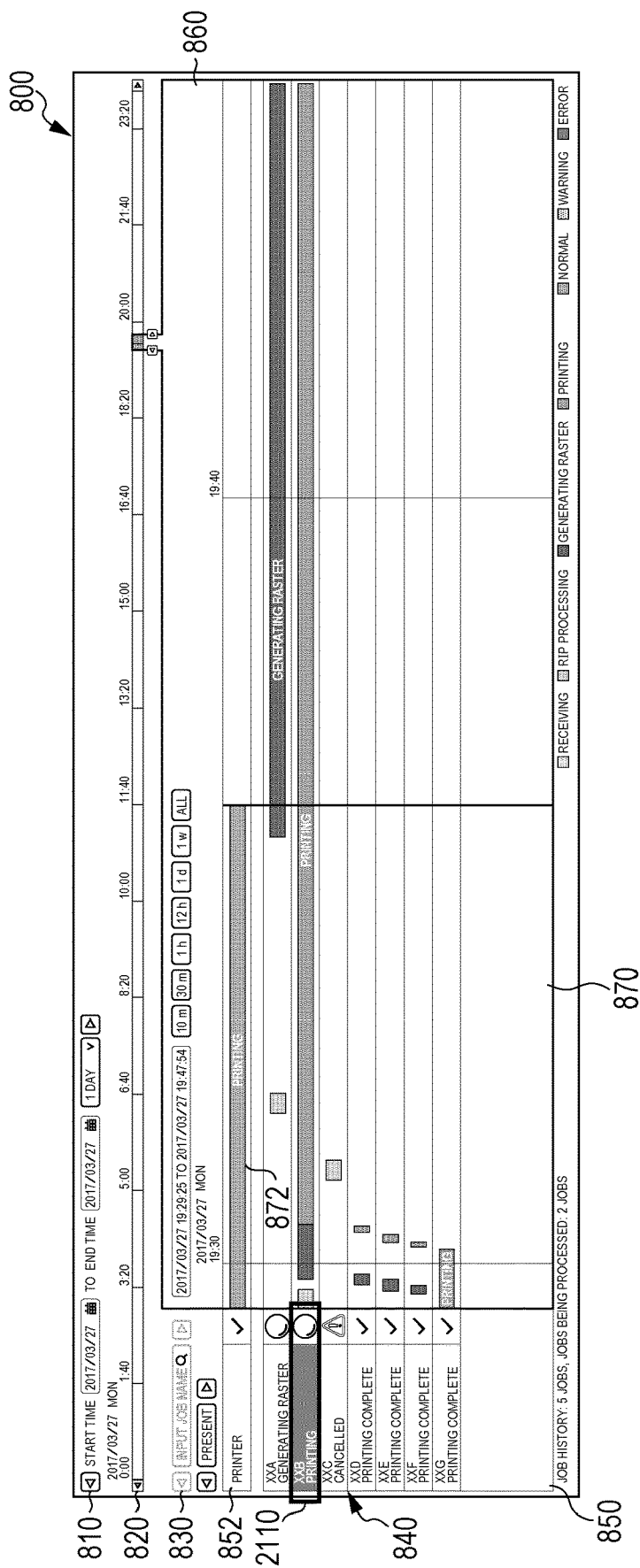
FIG. 21 is an explanatory diagram illustrating an exemplary display according to the exemplary embodiment.

FIG. 21 is an explanatory diagram illustrating an exemplary display according to the exemplary embodiment.

Similarly to the example of FIGS. 13A to 13C, the example illustrated in FIGS. 12A and 12B illustrates a case in which, when searching for "XXB" in the search expression reception field 830, a print job including "XXB" in the print job name is returned by the search. However, suppose that before the search, the search result print job 2110 was not being displayed inside the list area 850. In other words, it is the case of "No" in step S1906. In this case, the time axis is shifted and an enlargement/reduction process is executed so that the event start point of the print result print job 2110 becomes the left edge of the graphical area 870, and the end point becomes the right edge of the graphical area 870. Consequently, the event content of the print result print job 2110 is enlarged and displayed across the entire graphical area 870.

Figure 22:
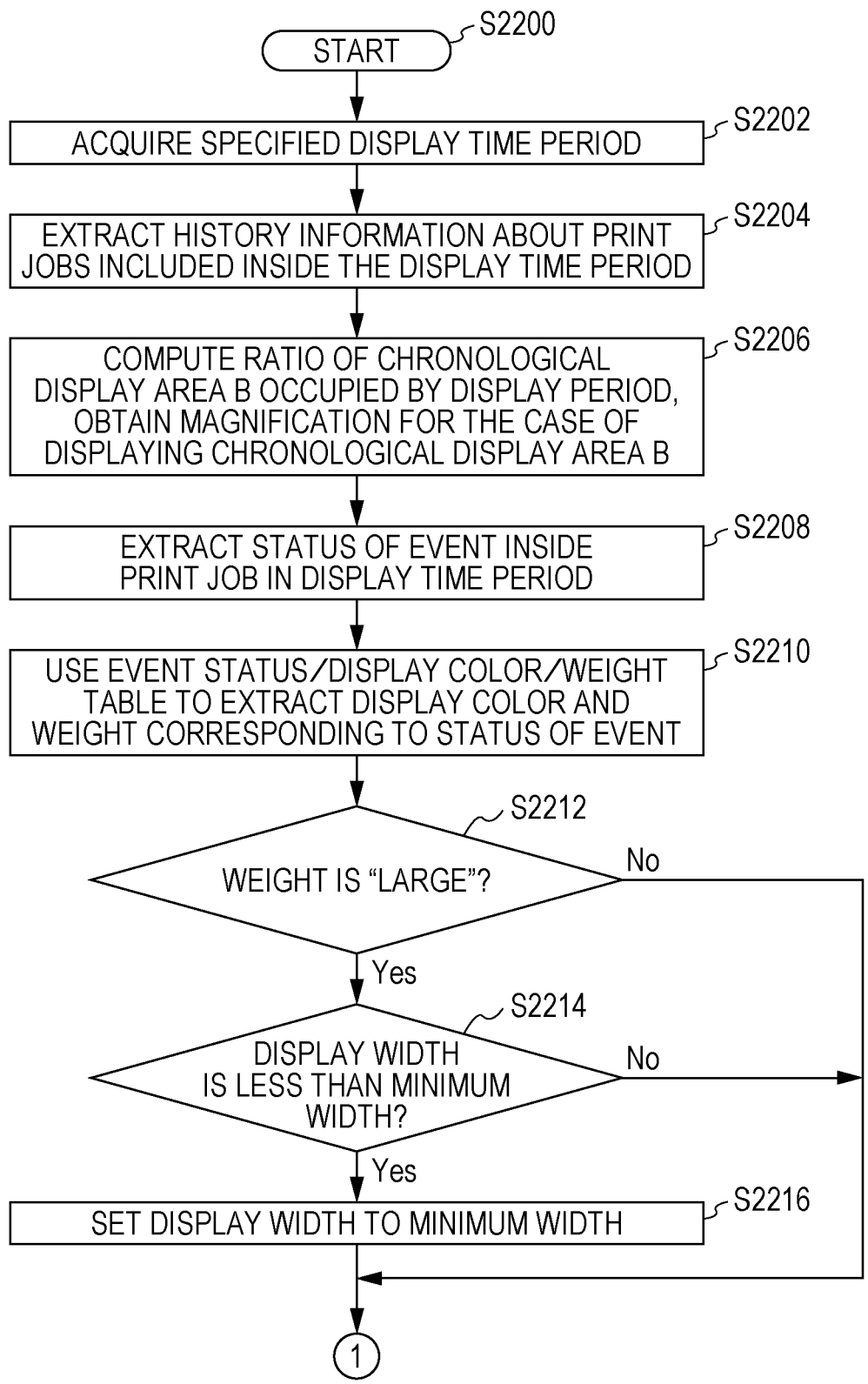
FIG. 22 is a flowchart illustrating an exemplary process according to the exemplary embodiment.
Figure 23:
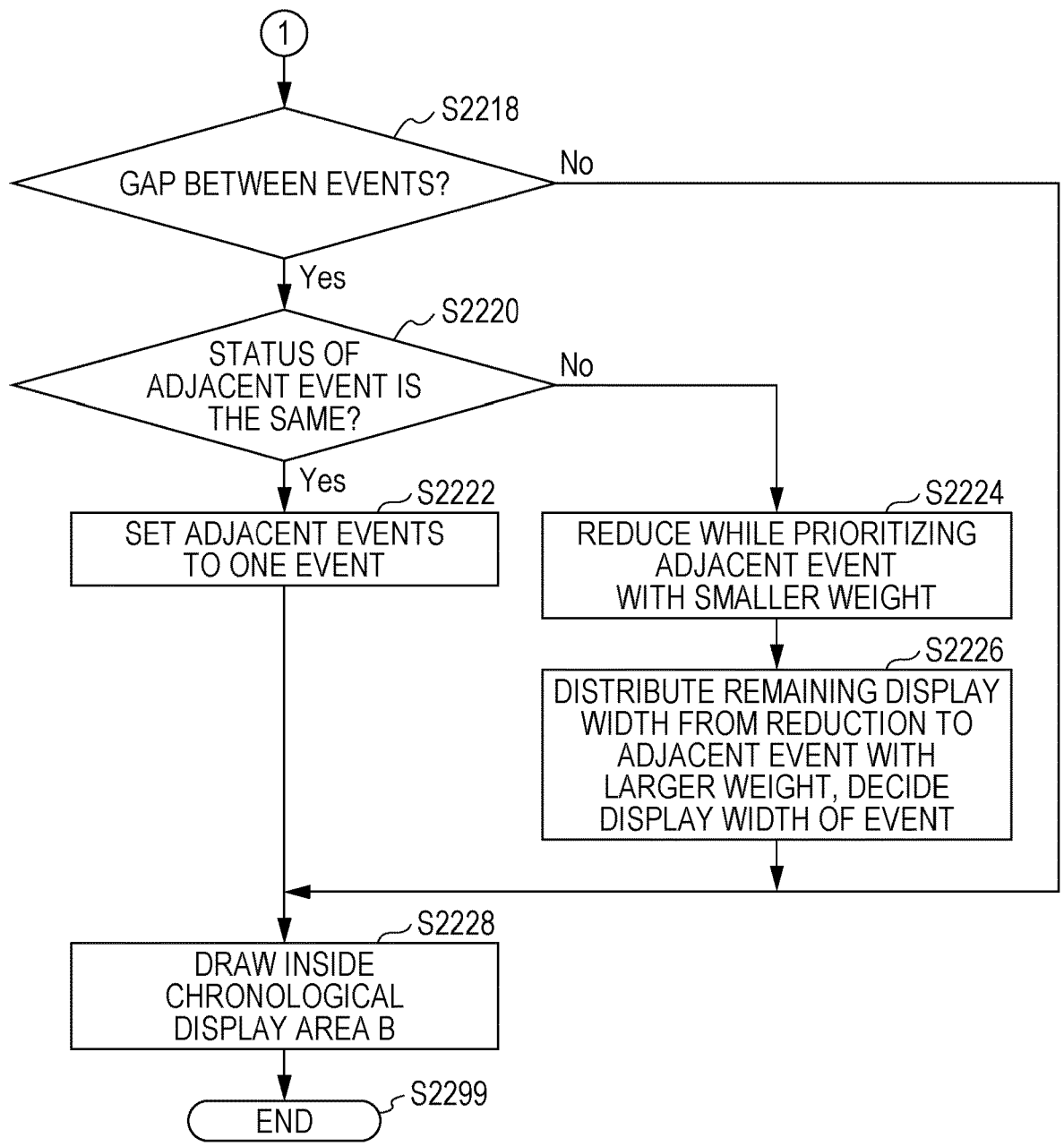
FIG. 23 is a flowchart illustrating an exemplary process according to the exemplary embodiment.

FIGS. 22 and 23 are flowcharts illustrating an exemplary process according to the exemplary embodiment.

When displaying printer events in the scrollbar-shaped time series display area 820, if a simple reduction is executed, there is a possibility of losing potentially important event information (such as an error) that occurs over a short amount of time. On the other hand, since a reduced display is being presented, displaying all events may be difficult. Accordingly in the exemplary embodiment, weights corresponding to the event status are used to curtail the loss of potentially important event information.

In step S2202, the specified display time band is acquired.

In step S2204, history information about print jobs included inside the display time band is extracted. In other words, history information about print jobs for which the start time or the end time of the print process is included in the display time band specified in step S2202 is acquired. Herein, print processes include the four events described earlier.

In step S2206, the ratio of the time series display area 820 occupied by the display time band is computed, and the magnification for displaying in the time series display area 820 is obtained. In other words, the history information extracted in step S2204 is used to arrange multiple events related to print jobs on a single time axis, and compute a magnification for displaying the events along the time axis contained in the time series display area 820 (obviously, this includes being inside the scroll bar (display time band) 910).

In step S2208, the status of events inside the print jobs in the display time band is extracted.

In step S2210, the event status/display color/weight table 2400 is used to extract a display color and weight corresponding to the event status. The event status/display color/weight table 2400 is an example of drawing rules when using rectangles to express event processing times specified by the start time and the end time of each event. FIG. 24 is an explanatory diagram illustrating an exemplary data structure of the event status/display color/weight table 2400. The event status/display color/weight table 2400 includes an event status field 2410, a display color field 2420, and a weight field 2430. The event status field 2410 stores the event status. The display color field 2420 stores the display color. The weight field 2430 stores the weight. In other words, the event status/display color/weight table 2400 weights each event in advance, and more important events are prioritized for display.

For example, the first row of the event status/display color/weight table 2400 stores "error" in the event status field 2410, "red" in the display color field 2420, and "large" in the weight field 2430. The second row stores "warning" in the event status field 2410, "yellow" in the display color field 2420, and "medium" in the weight field 2430. The third row stores "normal" in the event status field 2410, "green" in the display color field 2420, and "small" in the weight field 2430. Note that herein, the "normal" status includes the processes of receiving, generating the intermediate form, generating the image, and printing.

In the event status/display color/weight table 2400 illustrated in the example of FIG. 24, error statuses of greater weight than normal statuses are prioritized for display. For example, in the case in which the weight is "large" or "medium", the event is drawn with a width of 1 pixel, even if the reduced result is less than 1 pixel. Additionally, in the case in which the weight is "small", the event is not displayed if the reduced result is less than 1 pixel. Consequently, inside the time series display area 820, an event with the "error" status will be displayed, even if the event period is short. On the other hand, an event with the "warning" or "normal" status in some cases may not be displayed inside the time series display area 820 if the event period is short. In this way, in cases of displaying a compressed time axis, it is possible to display events without losing statuses which are desirably noticed by the user.

In step S2212, it is determined whether or not the weight is "large", and in the case of "large", the flow proceeds to step S2214. Otherwise, the flow proceeds to step S2218.

In step S2214, it is determined whether or not the display width is less than a minimum width, and in the case of being less than the minimum width, the flow proceeds to step S2216. Otherwise, the flow proceeds to step S2218.

In step S2216, the display width is set to the minimum width. Specifically, the display width is set to 1 pixel.

In step S2218, it is determined whether or not there is a gap between events, and in the case of no gap, the flow proceeds to step S2220. Otherwise, the flow proceeds to step S2228.

In step S2220, it is determined whether or not the status of adjacent events is the same, and in the case of being the same, the flow proceeds to step S2222. Otherwise, the flow proceeds to step S2224.

In step S2222, the adjacent events are set to a single event. In other words, in the case in which the gap between adjacent events would disappear due to the reduction by the magnification computed in step S2206, the adjacent events are drawn as a single event if the adjacent events have the same type of status information.

In step S2224, reduction is executed while prioritizing the adjacent event with the smaller weight. In other words, in the case in which adjacent events without a gap have different types of status information, the event with the smaller weight is prioritized and reduced by the magnification computed in step S2206. Herein, in a comparison of the weights of adjacent events, "the event with the smaller weight" corresponds to "medium" in the case of "large" and "medium", "small" in the case of "large" and "small", and "small" in the case of "medium" and "small".

In step S2226, the display width remaining from the reduction is distributed to the adjacent event with the larger weight to decide the display width of the event.

In step S2228, the events are drawn inside the time series display area 820. In other words, rectangles representing each event are drawn in the time series display area 820 by the magnification computed in step S2206, and reduced in the time axis direction in accordance with the weighting of each event.

Figure 25:
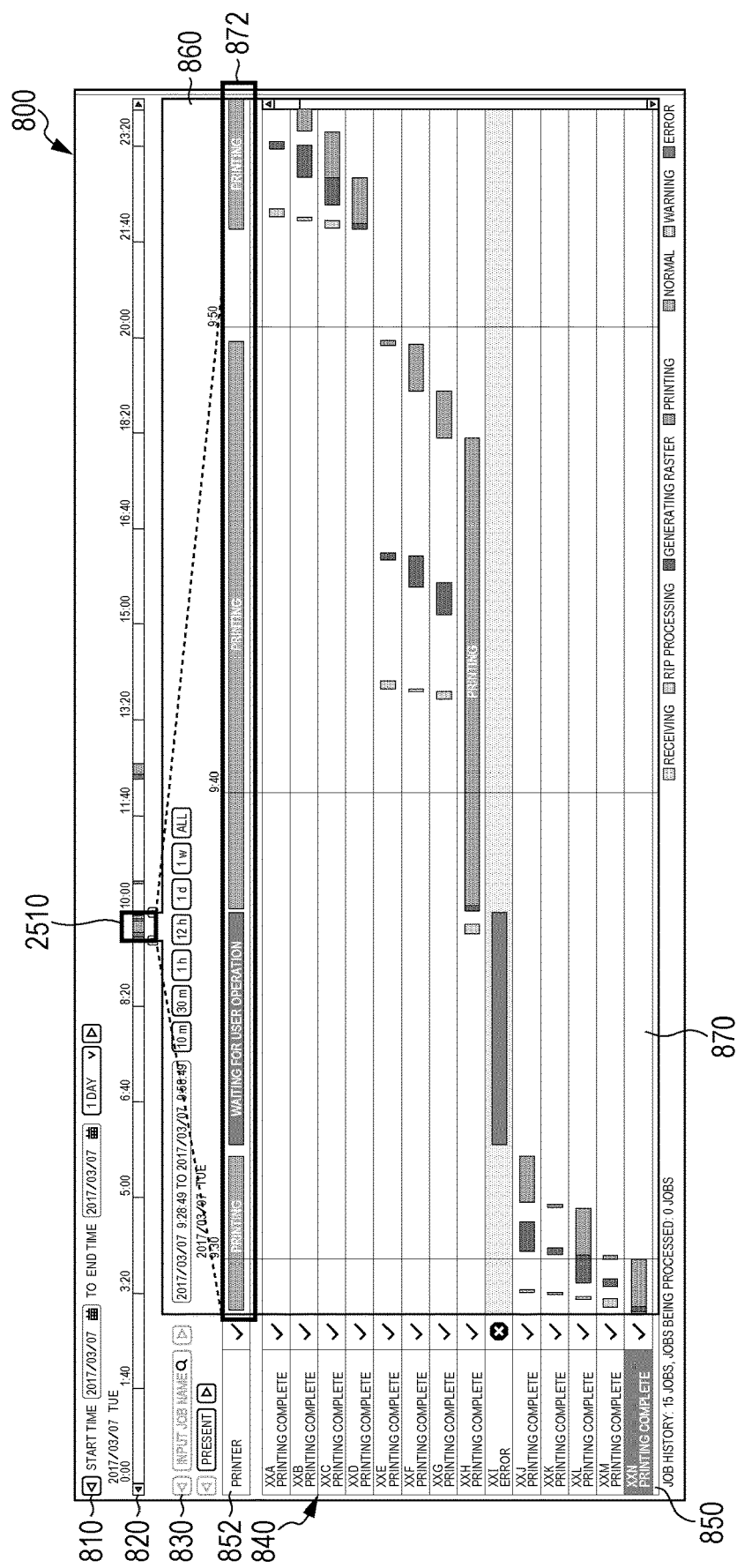
FIG. 25 is an explanatory diagram illustrating an exemplary display according to the exemplary embodiment.

FIG. 25 is an explanatory diagram illustrating an exemplary display according to the exemplary embodiment.

Events in the printer during the period specified by the target period setting field 810 are displayed graphically in the time series display area 820. The content of a display time band 2510 specified by a user operation is enlarged and displayed in the printer process graphical area 872. In the printer process graphical area 872, the events in the printer being displayed in the printer name display area 852 are displayed. Note that the printer process graphical area 872 may also be considered to be a summary of the events of each print job on the second and subsequent rows inside the graphical area 870.

In this way, in the display inside the time series display area 820, if a simple reduction is executed, there is a possibility of losing potentially important event information (such as an error) that occurs over a short amount of time.

In the exemplary embodiment, events with a large weight are configured not to be lost, in accordance with the weight of the event status determined by the event status/display color/weight table 2400.

Figure 26:
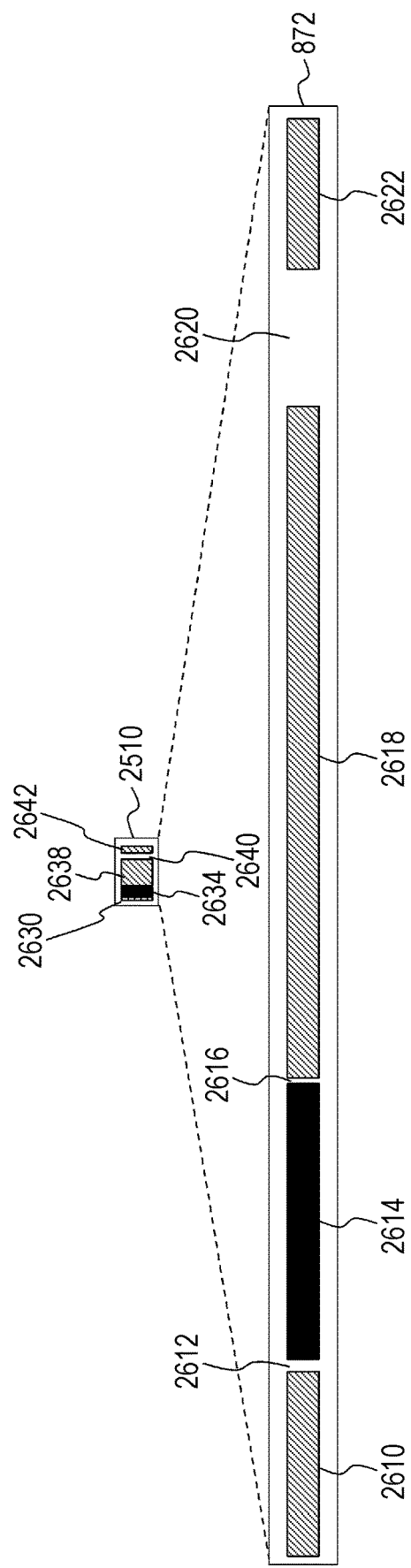
FIG. 26 is an explanatory diagram illustrating an exemplary display according to the exemplary embodiment.

FIG. 26 is an explanatory diagram illustrating an exemplary display according to the exemplary embodiment. In the example illustrated in FIG. 26, the relationship between the display time band 2510 illustrated in the example of FIG. 25 and the printer process graphical area 872 is displayed in a way that is easy to understand.

Inside the printer process graphical area 872, an event (normal) 2610, a gap 2612, an event (error) 2614, a gap 2616, an event (normal) 2618, a gap 2620, and an event (normal) 2622 are displayed.

Inside the display time band 2510, an event (normal) 2630, an event (error) 2634, an event (normal) 2638, a gap 2640, and an event (normal) 2642 are displayed. Herein, the event (normal) 2630 corresponds to the event (normal) 2610, the event (error) 2634 to the event (error) 2614, the event (normal) 2638 to the event (normal) 2618, the gap 2640 to the gap 2620, and the event (normal) 2642 to the event (normal) 2622. In addition, the gap 2612 and the gap 2616 are removed by the processing of the flowchart illustrated in the example of FIGS. 22 and 23. However, the status is different between the event (normal) 2610 and the event (error) 2614 which are made adjacent by the removal of the gap 2612, and since the weight of the event (normal) 2610 is smaller, the event (normal) 2610 is prioritized for reduction (reduced first). Subsequently, of the width in the case of reducing the entirety of the event (normal) 2610, the gap 2612, and the event (error) 2614, the remaining width after subtracting the width of the reduced event (normal) 2610 is set as the width of the event (error) 2634. In other words, the width of the event (error) 2634 corresponding to the event (error) 2614 is calculated to take a large width. Similarly, the status is different between the event (error) 2614 and the event (normal) 2618 which are made adjacent by the removal of the gap 2616, and since the weight of the event (normal) 2618 is smaller, the event (normal) 2618 is prioritized for reduction (reduced first). Subsequently, from the width in the case of reducing the entirety of the event (error) 2614, the gap 2614, and the event (normal) 2618, the remaining width after subtracting the width of the reduced event (normal) 2618 is set as the width of the event (error) 2634. In other words, the width of the event (error) 2634 corresponding to the event (error) 2614 is calculated to take a large width.

FIG. 27 is an explanatory diagram illustrating an exemplary display according to the exemplary embodiment. FIG. 27 illustrates a different example from the example of FIG. 26. A display time band 2750 is in the time series display area 820, and corresponds to the display time band 2510 described above.

For an event (normal) 2710, the weight is "small", and since the display width becomes less than the minimum width as a result of reduction, the event (normal) 2710 is not displayed in the display time band 2750.

For an event (error) 2714, the display width becomes less than the minimum width as a result of reduction, but since the weight is "large", the event (error) 2714 is displayed at the minimum width inside the display time band 2750 as the event (error) 2754.

For a gap 2720, the display width becomes less than the minimum width as a result of reduction, and since an event (normal) 2718 and an event (normal) 2722 have the same event status, the events are display inside the display time band 2750 as a single event (normal) 2758.

For a gap 2728, the display width becomes less than the minimum width as a result of reduction, but since an event (warning) 2726 and an event (normal) 2730 have different event statuses, the event (normal) 2730 is prioritized and reduced to become an event (normal) 2770, while the remaining display width becomes an event (warning) 2766 indicating the event (warning) 2726.

Note that the "remaining display width" herein is computed as follows.
(1) The display width inside the display time band 2750 indicating the combined period of the event (warning) 2726, the gap 2728, and the event (normal) 2730 is computed. Specifically, this display width is the display width in the case of allocating the time band from the start time of the event (warning) 2726 to the end time of the event (normal) 2730 inside the display time band 2750.
(2) From the display width computed in (1), subtract the reduced event (normal) 2730 and the reduced gap 2728 (substantially 0), and treat the resulting display width as the display width of the event (warning) 2766 indicating the event (warning) 2726. Note that being able to achieve prioritized display by controlling the order of division is because in the division for reduction, the value past the decimal point is rounded down. In other words, since the event of smaller weight (the event (normal) 2730) is reduced first, the effect of rounding down past the decimal point creates the possibility that the display width may become larger for the event of larger weight (the event (warning) 2726). Herein, the "display width becoming larger" means that the using the remaining display width results in a larger display width compared to the case of simply reducing the display width of the event with the larger weight.

An exemplary hardware configuration of the display apparatus 100, the print server 200, the printer 220, and the like according to the exemplary embodiment will be described with reference to FIG. 28. The configuration illustrated in FIG. 28 may be realized by a computer or the like, which may be a personal computer (PC) or a server, for example, and illustrates an exemplary hardware configuration equipped with a data reading unit 2817 such as a scanner, and a data output unit 2818 such as a printer.

The central processing unit (CPU) 2801 is a controller that executes processing according to a computer program that states execution sequences for the various modules described in the foregoing exemplary embodiment, or in other words, for respective modules such as the receiving module 105, the transmitting module 110, the print job specifying module 115, the time chart display module 125, the setting module 130, the display position setting module 135, the display range setting module 140, the enlargement/reduction ratio decision module 145, the drawing rule decision module 150, the display control module 160, the drawing module 165, the image processing control module 170, the intermediate form generation module 175, the image generation module 180, and the print module 185.

The read-only memory (ROM) 2802 stores information such as programs and computational parameters used by the CPU 2801. The random access memory (RAM) 2803 stores information such as programs used during execution by the CPU 2801, and parameters that change as appropriate during such execution. These memory units are connected to each other by a host bus 2804 realized by a CPU bus, for example.

The host bus 2804 is connected to an external bus 2806 such as a Peripheral Component Interconnect/Interface (PCI) bus via the bridge 2805.

The keyboard 2808 and the mouse or other pointing device 2809 are devices operated by a user. The display 2810 may be a liquid crystal display (LCD) or cathode ray tube (CRT) apparatus, and displays various information as text and image information. Additionally, a device such as a touchscreen equipped with the functions of both the pointing device 2809 and the display 2810 is also acceptable. In this case, to realize the function of a keyboard, even if a device like the keyboard 2808 is not connected physically, a keyboard may also be drawn on the screen (touchscreen) by software (also called a software keyboard, an on-screen keyboard, or the like) to realize the function of a keyboard.

The hard disk drive (HDD) 2811 houses and drives a hard disk (which may also be flash memory or the like), causing programs executed by the CPU 2801 and information to be recorded thereto or retrieved therefrom. The hard disk realizes the functions of the print job information storage module 120, the drawing rule storage module 155, and the like. Additionally, information such as various other data and various computer programs are stored therein.

The drive 2812 reads out data or programs recorded onto a removable recording medium 2813 such as an inserted magnetic disk, optical disc, magneto-optical disc, or semiconductor memory, and supplies the data or programs to the RAM 2803 connected via the interface 2807, the external bus 2806, the bridge 2805, and the host bus 2804. Note that the removable recording medium 2813 is also usable as a data recording area.

The connection port 2814 is a port that connects to externally connected equipment 2815, and has a USB, IEEE 1394, or similar receptacle. The connection port 2814 is connected to the CPU 2801 via the interface 2807, the external bus 2806, the bridge 2805, the host bus 2804, and the like. The communication unit 2816 is connected to a communication link and executes data communication processing with external equipment. The data reading unit 2817 may be a scanner, for example, and executes document scanning processing. The data output unit 2818 may be a printer, for example, and executes document data output processing.

Note that the hardware configuration of the display apparatus 100, the print server 200, the printer 220, and the like illustrated in FIG. 28 illustrates a single exemplary configuration, and that the exemplary embodiment is not limited to the configuration illustrated in FIG. 28 insofar as the configuration still enables execution of the modules described in the exemplary embodiment. For example, some modules may also be realized with special-purpose hardware (such as an application-specific integrated circuit (ASIC), for example), and some modules may be configured to reside within an external system and be connected via a communication link. Furthermore, it may also be configured such that multiple instances of the system illustrated in FIG. 28 are connected to each other by a communication link and operate in conjunction with each other. Additionally, besides a personal computer in particular, an exemplary embodiment may also be incorporated into a device such as a mobile information/communication device (including devices such as a mobile phone, a smartphone, mobile equipment, and a wearable computer), information appliance, robot, photocopier, fax machine, scanner, printer, or multi-function device (that is, an image processing device having two or more from among scanning, printing, copying, and faxing functions).

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

The recording medium may be a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), the Internet, an intranet, an extranet, or some combination thereof, or alternatively, by being modulated onto a carrier wave and propagated.

Furthermore, the above program may be part or all of another program, or be recorded to a recording medium together with other separate programs. The above program may also be recorded in a split manner across multiple recording media. The above program may also be recorded in a compressed, encrypted, or any other recoverable form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display apparatus comprising:
    a specifying section that specifies print jobs satisfying a search condition designated to select a print job;
    a decision section that decides an enlargement/reduction ratio on a time axis so that when events related to print jobs satisfying the search condition are displayed in a display area arranged in a time series, a start time of a first event and an end time of a last event are contained in the display area; and
    a display controller that controls the display of a line of events related to print jobs satisfying the search condition, enlarged or reduced by the decided enlargement/reduction ratio, in the display area.

2. The display apparatus according to claim 1, wherein the decision section decides the enlargement/reduction ratio in a case in which a print job specified by the specifying section is not being displayed in the display area.

3. The display apparatus according to claim 1, wherein the decision section does not execute the process of deciding the enlargement/reduction ratio in a case in which the print job specified by the specifying section is being displayed in the display area.

4. The display apparatus according to claim 3, further comprising:
    a setting section that sets a start point and/or an end point on a time axis when displaying events related to the specified print job arranged in a time series in the display area, in accordance with an attribute of the print job, in a case in which the print job specified by the specifying section is being displayed in the display area.

5. A printer comprising:
    a display that includes
        a specifying section that specifies print jobs satisfying a search condition designated to select a print job;
        a decision section that decides an enlargement/reduction ratio on a time axis so that when events related to print jobs satisfying the search condition are displayed in a display area arranged in a time series, a start time of a first event and an end time of a last event are contained in the display area; and
        a display controller that controls the display of a line of events related to print jobs satisfying the search condition, enlarged or reduced by the decided enlargement/reduction ratio, in the display area, and
    a printing section that executes printing according to a print job.

6. A print control apparatus comprising:
    a display that includes
        a specifying section that specifies print jobs satisfying a search condition designated to select a print job;
        a decision section that decides an enlargement/reduction ratio on a time axis so that when events related to print jobs satisfying the search condition are displayed in a display area arranged in a time series, a start time of a first event and an end time of a last event are contained in the display area; and
        a display controller that controls the display of a line of events related to print jobs satisfying the search condition, enlarged or reduced by the decided enlargement/reduction ratio, in the display area, and
    a print controller that causes a printer to execute a print process according to a print job.

7. A non-transitory computer readable medium storing a program causing a computer to execute a process for displaying information, the process comprising:
    specifying print jobs satisfying a search condition designated to select a print job;
    deciding an enlargement/reduction ratio on a time axis so that when events related to print jobs satisfying the search condition are displayed in a display area arranged in a time series, a start time of a first event and an end time of a last event are contained in the display area; and
    controlling the display of a line of events related to print jobs satisfying the search condition, enlarged or reduced by the decided enlargement/reduction ratio, in the display area.

* * * * *